US011321396B2

(12) United States Patent
Makhija

(10) Patent No.: US 11,321,396 B2
(45) Date of Patent: May 3, 2022

(54) IDENTIFYING A POLYGON REPRESENTATIVE OF GEOGRAPHICAL BOUNDARIES

(71) Applicant: VERIZON PATENT AND LICENSING INC., Basking Ridge, NJ (US)

(72) Inventor: Gaurav Makhija, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 149 days.

(21) Appl. No.: 16/208,624

(22) Filed: Dec. 4, 2018

(65) Prior Publication Data

US 2020/0175075 A1 Jun. 4, 2020

(51) Int. Cl.
*G06F 16/00* (2019.01)
*G06F 16/9035* (2019.01)
*G06F 16/9038* (2019.01)
*G06F 16/903* (2019.01)
*H04W 4/021* (2018.01)
*G06F 16/29* (2019.01)
*G06T 7/62* (2017.01)
*G06T 7/13* (2017.01)
*G06T 11/20* (2006.01)
*G06V 20/10* (2022.01)

(52) U.S. Cl.
CPC .......... *G06F 16/9035* (2019.01); *G06F 16/29* (2019.01); *G06F 16/9038* (2019.01); *G06F 16/90335* (2019.01); *G06T 7/13* (2017.01); *G06T 7/62* (2017.01); *G06T 11/203* (2013.01); *G06V 20/176* (2022.01); *H04W 4/021* (2013.01)

(58) Field of Classification Search
None
See application file for complete search history.

(56) References Cited

U.S. PATENT DOCUMENTS

| | | | | |
|---|---|---|---|---|
| 7,363,319 | B2* | 4/2008 | Cappellini | G06Q 10/08 |
| 7,822,705 | B2* | 10/2010 | Xia | G06F 16/22 |
| | | | | 707/603 |
| 9,886,845 | B2* | 2/2018 | Rhoads | H04N 1/00307 |
| 10,204,364 | B1* | 2/2019 | Kolton | G06Q 30/02 |
| 10,445,927 | B2* | 10/2019 | Kwant | G06T 17/20 |
| 10,684,753 | B2* | 6/2020 | Collins | G06F 16/532 |
| 2003/0158668 | A1* | 8/2003 | Anderson | G06T 17/05 |
| | | | | 702/5 |

(Continued)

*Primary Examiner* — Farhan M Syed

(57) ABSTRACT

One or more computing devices, systems, and/or methods for identifying polygons that are accurate representations of geographical boundaries of properties are presented. For example, a polygon may be selected from a database of polygons. The polygon may comprise a representation of geographical boundaries of a property associated with an entity. The polygon may be associated with a location and/or a size. A location database may be analyzed to identify a second location associated with the property. An offset distance may be determined based upon the location and the second location. The database of polygons may be analyzed to determine an expected size of the property based upon a plurality of polygons associated with the entity. A size difference between the expected size of the property and the size may be determined. A quality score associated with the polygon may be generated based upon the offset distance and the size difference.

20 Claims, 12 Drawing Sheets

(56) References Cited

U.S. PATENT DOCUMENTS

| | | | | |
|---|---|---|---|---|
| 2008/0214153 A1* | 9/2008 | Ramer | ............... | G06F 16/9577 |
| | | | | 455/414.1 |
| 2008/0214156 A1* | 9/2008 | Ramer | ................ | G06F 16/68 |
| | | | | 455/414.1 |
| 2008/0214157 A1* | 9/2008 | Ramer | ................ | G06F 16/68 |
| | | | | 455/414.1 |
| 2008/0215475 A1* | 9/2008 | Ramer | ................ | G06Q 30/02 |
| | | | | 705/37 |
| 2008/0215557 A1* | 9/2008 | Ramer | ................ | G06F 16/68 |
| 2008/0215623 A1* | 9/2008 | Ramer | ............... | G06F 16/9577 |
| 2009/0005968 A1* | 1/2009 | Vengroff | ............ | G06F 16/9537 |
| | | | | 701/425 |
| 2010/0318588 A1* | 12/2010 | Buford | ................ | H04W 4/029 |
| | | | | 707/955 |
| 2011/0016106 A1* | 1/2011 | Xia | ................... | G06F 16/9537 |
| | | | | 707/706 |
| 2012/0191695 A1* | 7/2012 | Xia | ....................... | G06F 16/29 |
| | | | | 707/711 |
| 2014/0310162 A1* | 10/2014 | Collins | ................. | G06F 16/29 |
| | | | | 705/39 |
| 2015/0242423 A1* | 8/2015 | Xia | ....................... | G06F 16/29 |
| | | | | 707/711 |
| 2018/0137675 A1* | 5/2018 | Kwant | ................... | G06T 17/20 |
| 2019/0005574 A1* | 1/2019 | Olivier | .............. | G06Q 30/0645 |
| 2020/0285374 A1* | 9/2020 | Collins | .............. | G06F 3/04842 |

\* cited by examiner

IDENTIFYING A POLYGON REPRESENTATIVE OF GEOGRAPHICAL BOUNDARIES

BACKGROUND

Many services, such as websites, applications, etc. may provide platforms for viewing media. For example, a user may interact with a service, where the service may use location information associated with the user to determine interests of the user. The location information may be received from a client device associated with the user. Using the location information of the user and/or the client device, it may be mistakenly determined that the user visited a property (e.g., a building, field, etc.) even though the user did not visit the property. Media may be selected for the user based upon the property, where the media may have first subject matter associated with the property. The user may not be interested in the first subject matter and/or may not interact with the media.

SUMMARY

In accordance with the present disclosure, one or more computing devices and/or methods are provided. In an example, a first polygon may be selected from a database of polygons. The first polygon may comprise a representation of geographical boundaries of a first property associated with a first entity. The first polygon may be associated with a first location and a first size. A location database may be analyzed to identify a second location associated with the first property. The location database may comprise a plurality of locations associated with a plurality of properties. A first offset distance may be determined based upon the first location associated with the first polygon and the second location associated with the first property. The database of polygons may be analyzed to determine an expected size of the first property based upon a plurality of polygons, of the database of polygons, associated with the first entity. A size difference may be determined based upon the expected size of the first property and the first size associated with the first polygon. A quality score associated with the first polygon may be generated based upon the first offset distance and the size difference.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
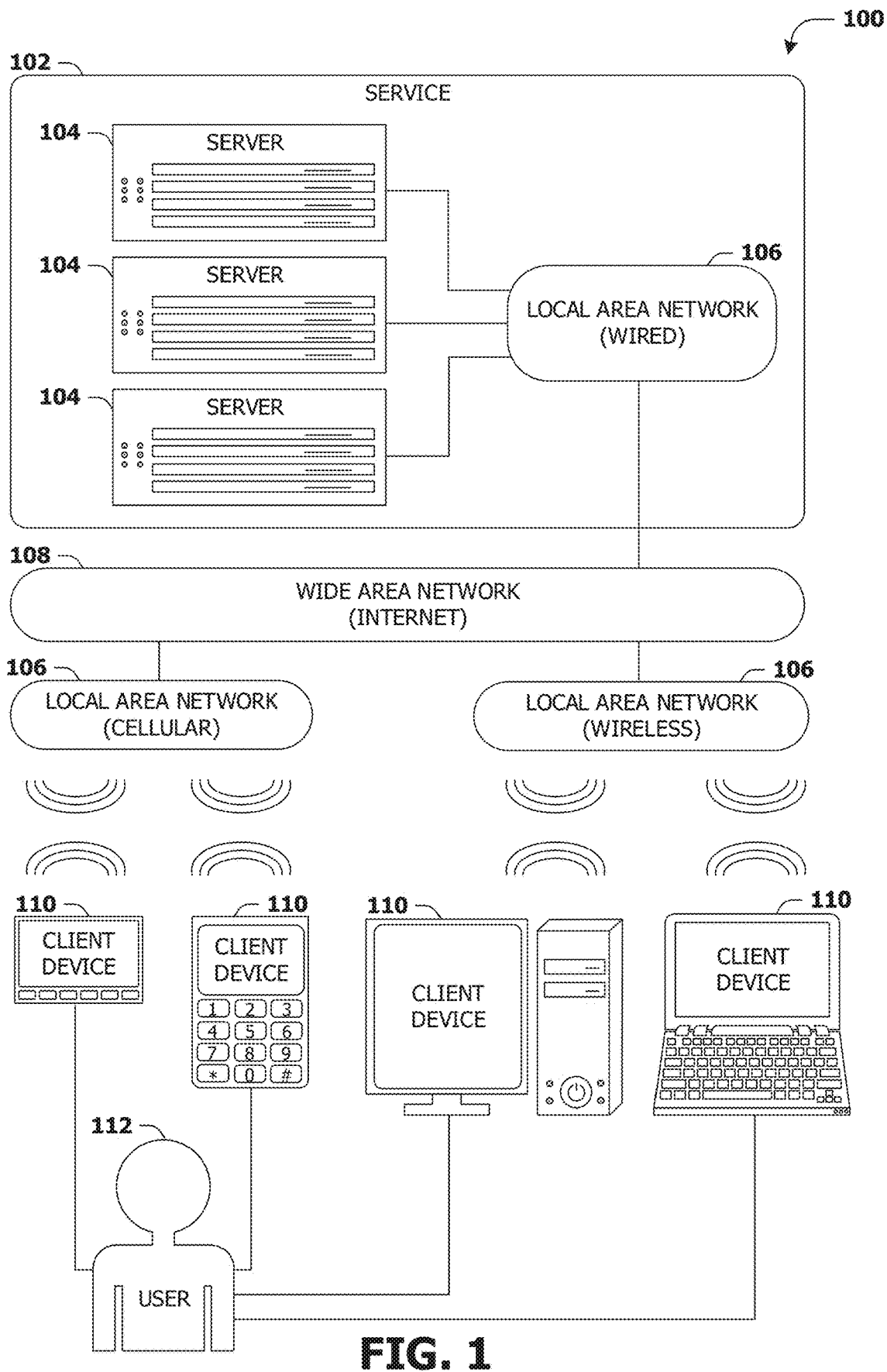
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
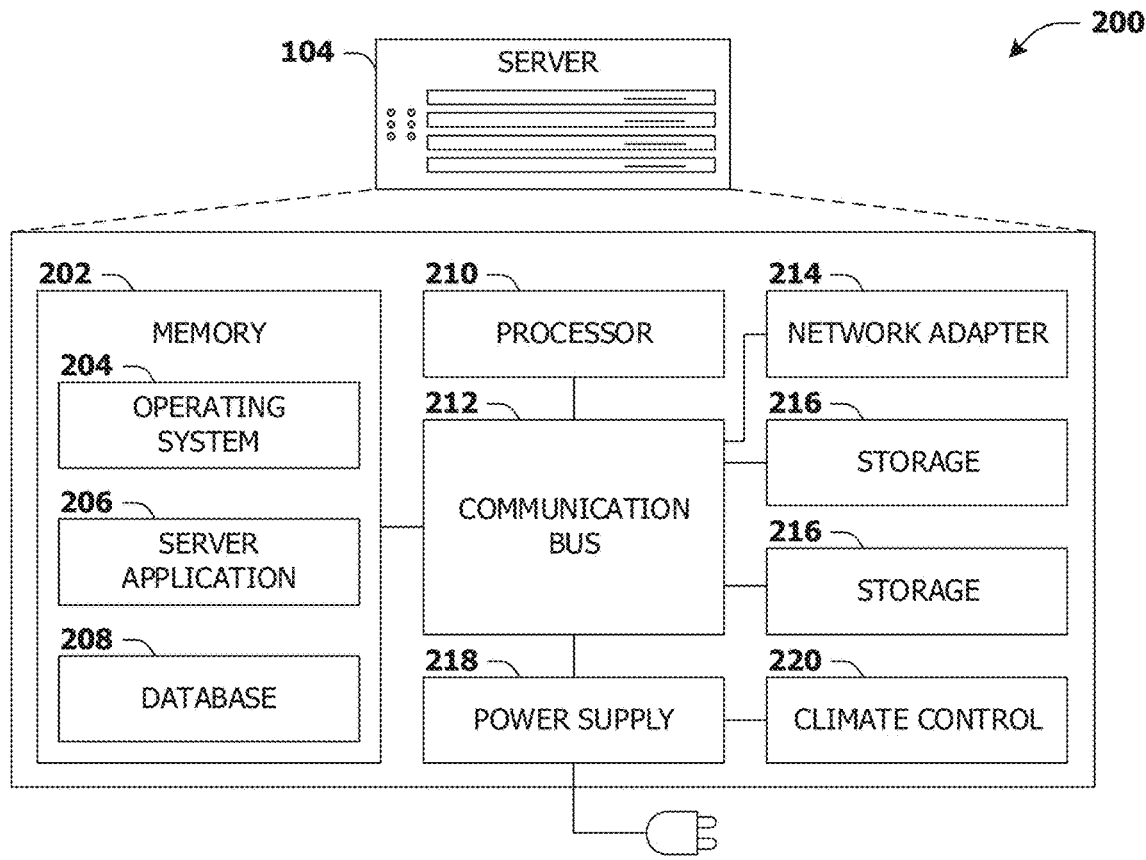
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
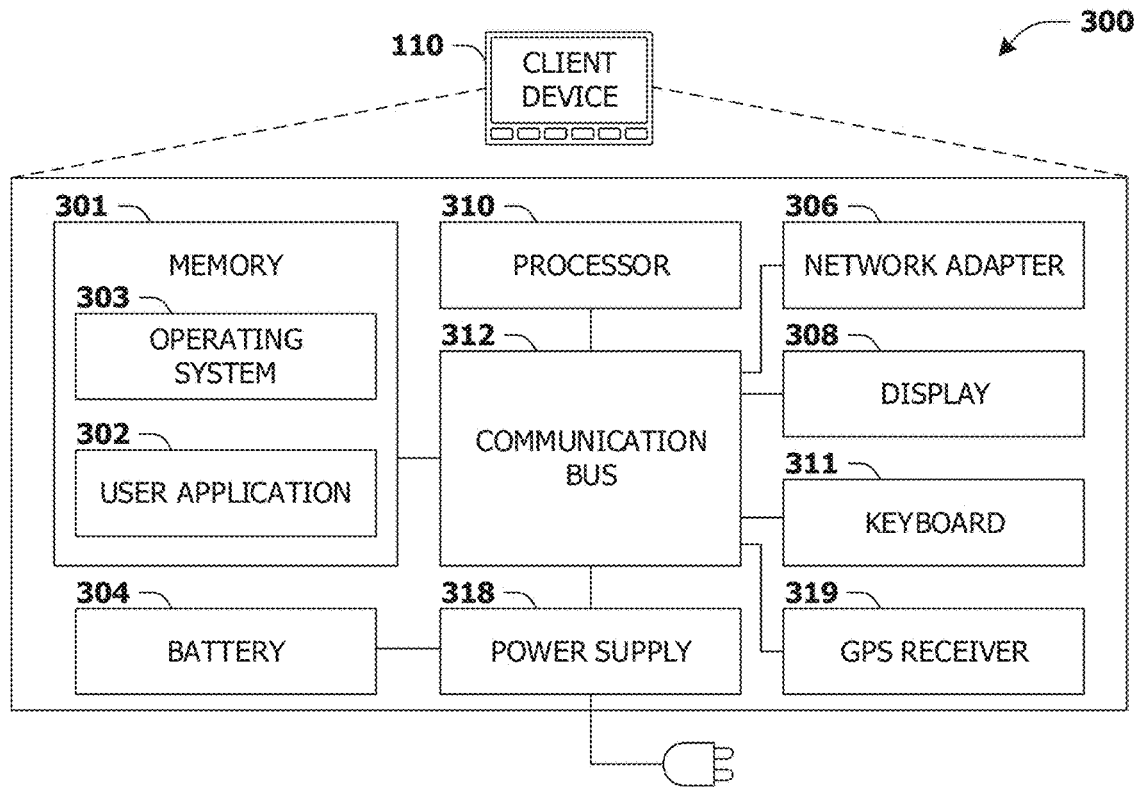
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices, systems, and/or techniques for identifying polygons that are accurate representations of geographical boundaries of properties associated with entities are presented. For example, a user (and/or a device associated with the user) may access and/or interact with a service, such as a browser, software, a website, an application, an operating system, etc. that provides a platform for viewing and/or downloading content from a server associated with a content system. In some examples, the content system may use location information associated with the user to determine interests of the user. For example, the location information may be received from the device.

In some examples, a location of the user and/or the device may be compared with polygons of a database of polygons. For example, a polygon may comprise a representation (e.g., a geometrical representation) of geographical boundaries associated with a property (e.g., a structure, a building, a construct, a field, a parking area, etc.) associated with an entity (e.g., a company, a business, a retail chain such as a chain store and/or a chain restaurant, etc.). In some examples, it may be determined that the location of the user and/or the device is within a first polygon of the database of polygons associated with a first property.

However, the first polygon may be an inaccurate representation of the first property (e.g., a polygon location of the first polygon may be different than an actual location of the first property, a polygon size of the first polygon may be different than an actual size of the first property, a polygon shape of the first polygon may be different than an actual shape of the first property, etc.). As a result, a determination that the user visited the first property, may be incorrect. A first content item may be selected for the user based upon the (incorrect) determination that the user visited the first property, where the first content item may have first subject matter associated with the first property and/or a first entity associated with the first property. For example, the first content item may be presented to the user. However, the user may not have an interest in the first subject matter and/or may not interact with the first content item.

Thus, in accordance with one or more of the techniques presented herein, polygons of the database of polygons may be analyzed to determine whether they accurately represent properties associated with the polygons. For example, a second polygon may be selected from the database of polygons. The second polygon may be associated with a first location and/or a first size. The second polygon may comprise a representation (e.g., a geometrical representation) of a second property associated with a second entity. A location database may be analyzed to identify a second location associated with the second property. For example, the second location may comprise a set of coordinates (e.g., a longitude coordinate and/or a latitude coordinate) associated with the second property. A first offset distance may be determined based upon the first location associated with the second polygon and the second location associated with the second property.

The database of polygons may be analyzed to determine an expected size of the second property based upon a plurality of polygons associated with the second entity. A size difference may be determined based upon the expected size of the second property and the first size associated with the second polygon. A quality score associated with the second polygon may be generated based upon the first offset distance and/or the size difference. Responsive to a determination that the quality score is greater than a threshold quality score, the second polygon may be added to a database of accurate polygons and/or may be used to determine instances that the second property is visited by users.

Figure 4:
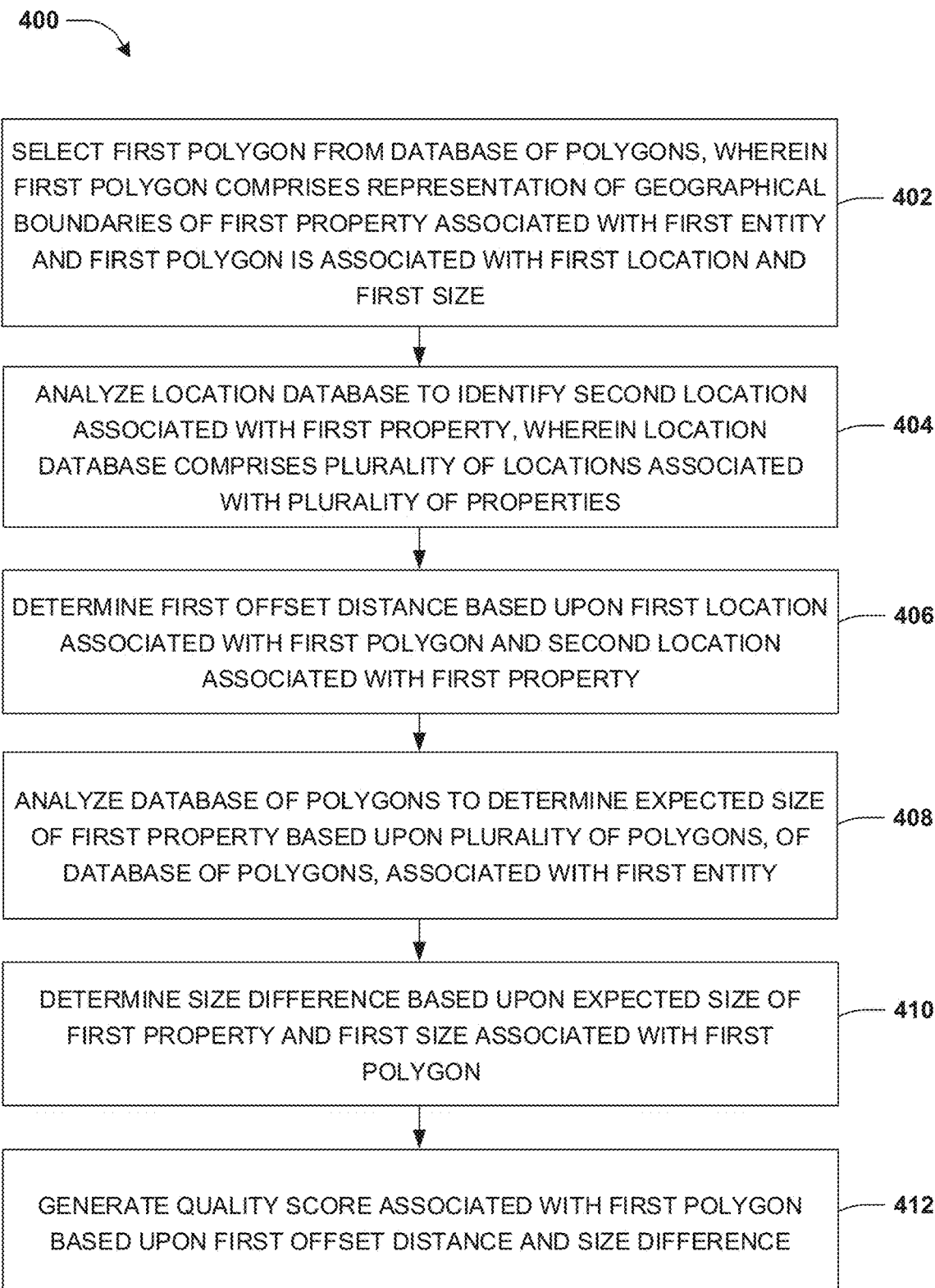
FIG. 4 is a flow chart illustrating an example method for identifying polygons that are accurate representations of geographical boundaries of properties associated with entities.

An embodiment of identifying polygons that are accurate representations of geographical boundaries of properties associated with entities is illustrated by an example method 400 of FIG. 4. A user, such as user Jill, (and/or a client device associated with the user) may access and/or interact with a service, such as a browser, software, a website, an application, an operating system, etc. that provides a platform for viewing and/or downloading content from a server associated with a content system. For example, the content system may transmit content items to the client device and/or may display content items using a graphical user interface of the client device. For example, the content items may comprise notifications, images, interactive content items, emails, videos, audio notifications, etc. Alternatively and/or additionally, the content system may present content items in one or more locations throughout websites, applications, email interfaces, etc. For example, the content system may be associated with an advertising system. Alternatively and/or additionally, the content system may not be associated with an advertising system.

In some examples, the content system may determine interests of the user by utilizing location information of the user. For example, the location information may be indicative of a client location of the client device (and/or the user). For example, the location information may be received from the client device. Alternatively and/or additionally, the location information may be received from a wireless network (e.g., a WiFi network, a hotspot, a wireless access point (WAP), a network associated with a base station, etc.) that the client device is connected to. For example, the location information may comprise received signal strength indicators (RSSIs) associated with communications between the client device and the wireless network. Alternatively and/or additionally, the location information may comprise angle of arrival (AoA) information. One or more RSSI localization techniques and/or one or more trilateration techniques may be performed using the RSSIs and/or the AoA information to determine the client location of the client device.

Alternatively and/or additionally, the location information may comprise satellite navigation information comprising longitude measurements, latitude measurements and/or altitude measurements associated with locations of the client device. The satellite navigation information may be received from a satellite navigation system, such as a global navigation satellite system (GNSS) (e.g., Global Positioning System (GPS), Global Navigation Satellite System (GLONASS), Galileo, etc.). In some examples, the client location of the client device (and/or the user) may be determined based upon merely the satellite navigation information. Alternatively and/or additionally, the client location may be determined based upon a combination of the satellite navigation information, the AoA information and/or the RSSIs.

In some examples, the location information of the client device may be stored in a client location database associated with the client device and/or the user. For example, the client location database may comprise a plurality of visited locations associated with the user. For example, each visited location of the plurality of visited locations may correspond to a location that the user visited (e.g., it may be detected that the client device was located at each visited location of the plurality of visited locations). Alternatively and/or additionally, the client location database may comprise a plurality of visit quantities associated with the plurality of visited locations. Each quantity of the plurality of visit quantities may be indicative of a number of instances that the user and/or the client device visited a visited location of the plurality of visited locations. Alternatively and/or additionally, the client location database may comprise a plurality of visiting rates associated with the plurality of visited locations. Each visiting rate of the plurality of visiting rates may be indicative of a rate at which a visited location of the plurality of visited locations is visited. For example, a visiting rate may be a quantity of instances that a visited location is visited per unit of time (e.g., hour, day, week, etc.).

The plurality of visited locations and/or the plurality of visiting rates associated with the user may be leveraged to determine interests of the user. For example, the plurality of visited locations may be compared with locations of entities (e.g., businesses, companies, stores, schools, organizations, non-profit organizations, spiritual centers, etc.) to determine entities that the user visited. For example, it may be determined that the plurality of visited locations match a set of entities. A set of interests of the user, such as shopping habits of the user, stores frequented by the user, products that the user is interested in, services that the user is interested in, etc. may be determined based upon the set of entities (e.g., the set of interests may include clothes shopping if the set of entities comprises a clothing store, the set of interests may include electronics shopping if the set of entities comprises an electronics store, etc.). Alternatively and/or additionally, a weight may be applied to each interest of the set of interests based upon visiting rates associated with the set of entities. For example, a weight associated with an interest of the set of interests may be generated based upon a visit quantity associated with an entity corresponding to the interest and/or a visiting rate associated with the entity. For example, the visit quantity and/or the visiting rate may be combined to generate the weight. Alternatively and/or additionally, the set of interests may be prioritized (e.g., to determine interests of the set of interests that have a higher priority than other interests of the set of interests) based upon weights of the set of interests.

In order to determine that the plurality of visited locations match the set of entities, it may be useful to have an accurate representation of a property associated with each entity of the set of entities. It may be appreciated that some exemplary systems may attempt to determine which properties the user has visited by comparing the plurality of visited locations and/or the client location with location points, such as sets of coordinates, associated with the properties. For example, the exemplary systems may determine that a property associated with an entity is visited by the user based upon a determination that the client location is less than a threshold distance from a location point (e.g., a longitude coordinate and/or a latitude coordinate) associated with the property. However, this may yield inaccurate results because the exemplary systems may not take into account a size of the property, a shape of the property, entities different than the entity which may share the property, etc. Accordingly, the exemplary systems may determine that the user visited the property and/or that the user is interested in the entity, when in actuality, the user may have visited a different property near the property, the user may have merely passed by the property, the user may have merely parked in a parking space associated with the property, the user may have visited the property in order to visit a different entity other than the entity, etc.

It may be appreciated that using polygons to determine the set of entities visited by the user may yield more accurate results. A polygon may comprise a geometrical representation of geographical boundaries associated with a property. For example, responsive to a determination that the client location of the client device and/or the user is within the polygon and/or within a threshold distance from the polygon, it may be determined, with greater precision and/or accuracy than the exemplary systems, that the user visited the property. However, if the polygon is an inaccurate representation of the property, then it may be mistakenly determined that the user visited the property when in actuality, the user did not visit the property. Alternatively and/or additionally, if the polygon is an inaccurate representation of the property, then it may not be determined that the user visited the property, when in actuality, the user did visit the property.

Thus, to accurately determine which properties are visited by the user, it may be necessary to have a collection of accurate polygons for comparison with the client location. However, many polygons that are generated and/or used for comparison with the client location are inaccurate representations of properties. Thus, polygons may be checked for accuracy. Polygons that are determined to be inaccurate representations of properties may be discarded.

At 402, a first polygon may be selected from a database of polygons. For example, the first polygon may comprise a representation (e.g., a geometrical representation) of geographical boundaries of a first property associated with a first entity. For example, the first polygon may be overlaid onto a map comprising an area comprising the first property (e.g., the first property may be a part of the area). The first polygon may be associated with an outline of the first property, a first size of the first property, a first location of the first property, a first shape of the first property, side-lengths associated with the outline of the first property, etc. corresponding to a top of the first property associated with an aerial view (e.g., a bird's-eye view, an overhead view) of the first property (e.g., the first polygon may correspond to a rooftop of the first property). In some cases, the outline of the first property, the first size of the first property, the first location of the first property, the first shape of the first property and/or the side-length associated with the outline of the first property may be incorrect and/or inaccurate representations of the first property.

In some examples, the first property may comprise a structure, a building, a construct, a field, a parking lot, etc. Accordingly, the plurality of sides may correspond to side-edges of the structure, the building, the construct, the field and/or the parking lot of the first property. Alternatively and/or additionally, the first property may not include the parking lot associated with the structure, the building, the construct and/or the field. For example, the plurality of sides of the first property may correspond to side-edges of the structure, the building, the construct and/or the field of the property. Alternatively and/or additionally, the first polygon may comprise a representation of an entrance location associated with an entrance of the first property (e.g., the entrance may be a doorway through which a person may enter the first property, a gate through which a person may enter the first property, etc.). Alternatively and/or additionally, the first polygon may comprise a representation of a storefront location associated with a storefront of the first property.

Alternatively and/or additionally, the first entity may be a company, a business, a store, a restaurant, a retail chain such as a chain store and/or a chain restaurant, a school, an organization, a non-profit organization, a spiritual center, etc. For example, the first entity may use the first property (and/or other properties in different locations) for selling goods, providing services, holding meetings, etc. In some examples, the first polygon may be selected for analysis in order to check whether the first polygon is an accurate representation of the first property. For example, the database of polygons may undergo a checking process and/or polygons of the database of polygons, including the first polygon, may be selected for analysis to determine whether the polygons are accurate representations of properties. The checking process may be performed periodically (e.g., once per year, once per month, etc.).

In some examples, the first location may comprise a first set of coordinates associated with the first polygon. For example, the first set of coordinates may comprise a first longitude coordinate of the first polygon and/or a first latitude coordinate of the first polygon. For example, the first set of coordinates may be indicative of a first center point (e.g., a centroid) of the first polygon and/or a different point of the first polygon (e.g., an edge of the first polygon, etc.).

Alternatively and/or additionally, the first size may comprise a first area (e.g., square feet, square meters, etc.) associated with the first polygon. Alternatively and/or additionally, the first size may comprise a first radius (e.g., feet, meters, etc.) associated with the first polygon. For example, the first radius may correspond to a distance between the first location associated with the first polygon (e.g., the first center point of the first polygon) and a vertex of the first polygon. Alternatively and/or additionally, the first radius may correspond to a distance between the first location associated with the first polygon (e.g., the first center point of the first polygon) and the entrance location associated with the entrance of the first property. Alternatively and/or additionally, the first radius may correspond to a distance between the first center point of the first polygon and the storefront location associated with the storefront of the first property. In some examples, the first size (e.g., the first area and/or the first radius and/or one or more other size measurements associated with the first polygon) may be stored within the database of polygons and/or a different database.

In some examples, the database of polygons may comprise a plurality of sets of polygon information. For example, each set of polygon information of the plurality of sets of polygon information may correspond to a polygon of the database of polygons. For example, a set of polygon information of the plurality of sets of polygon information may comprise a name of an entity corresponding to a polygon, an address of the entity (e.g., a mailing address), a telephone number of the entity, a website associated with the entity, company information associated with the entity, etc.

In some examples, the database of polygons may be generated based upon polygons of a source of polygons. For example, first polygons may be extracted from the source of polygons. In some examples, the source of polygons may comprise entity listings (e.g., business listings) associated with the first polygons (e.g., an entity listing of the entity listings may comprise a name of an entity corresponding to a polygon of the first polygons, an address of the entity, a telephone number of the entity, a website associated with the entity, company information associated with the entity, etc.).

The first polygons may be grouped into a plurality of sets of polygons based upon attributes of the first polygons (e.g., the attributes may be determined based upon the entity listings). For example, the first polygons may be grouped into the plurality of sets of polygons based upon location, such that a first set of polygons of the plurality of sets of polygons may be associated with a first region (e.g., a first city, a first zip code, a first state, a first province, etc.), a second set of polygons of the plurality of sets of polygons may be associated with a second region, etc. Alternatively and/or additionally, the first polygons may be grouped into the plurality of sets of polygons based upon telephone numbers such that the first set of polygons may be associated with a first area code, the second set of polygons may be associated with a second area code, etc.

In some examples, polygons of each set of polygons of the plurality of sets of polygons may be compared with each other to identify duplicate polygons and/or duplicate entity listings. For example, pair wise matching may be performed based upon pairs of polygons of the first set of polygons to identify the duplicate polygons and/or the duplicate entity listings. Alternatively and/or additionally, pair wise matching may be performed based upon entity listings associated with pairs of polygons of the first set of polygons to identify the duplicate polygons and/or the duplicate entity listings. For example, pair wise matching may be performed on the first polygons and/or the entity listings using one or more machine learning techniques and/or one or more gradient boosted decision tree (GBDT) models to identify the duplicate polygons and/or the duplicate entity listings.

For example, responsive to identifying a set of duplicate polygons of the duplicate polygons (e.g., each duplicate polygon of the set of duplicate polygons may correspond to a single property and/or a single entity), the set of duplicate polygons may be combined to generate a single polygon based upon the set of duplicate polygons. The single polygon may be added to the database of polygons. A set of information corresponding to the single polygon, determined based upon entity listings associated with the set of duplicate polygons, may be added to the database of polygons. Alternatively and/or additionally, responsive to identifying the set of duplicate polygons of the duplicate polygons, the set of duplicate polygons may be analyzed to identify a highest quality polygon from amongst the set of duplicate polygons. The highest quality polygon may be added to the database of polygons and/or a set of information, determined based upon an entity listing associated with the highest quality polygon, may be added to the database of polygons.

Alternatively and/or additionally, the entity listings of the source of polygons may be limited (e.g., an entity listing of the entity listings may merely comprise a name of an entity corresponding to a polygon of the first polygons, for example). In some examples, a location of a polygon of the source of polygons may be compared with locations associated with an entity corresponding to the polygon (e.g., the locations may be extracted from mapping systems, business listing services, etc. which may provide location information, address information, telephone number information, polygon information, etc. associated with the entity). A closest location of the locations may be determined by determining that a distance between the location of the polygon and the closest location is less than distances between the location of the polygon and other locations of the locations. For example, it may be determined that the polygon matches the closest location based upon a determination that the distance between the location of the polygon and the closest location is less than a threshold distance (e.g., 500 feet, 1000 feet, 2000 feet, etc.). For example, the polygon may be added to the database of polygons. Alternatively and/or additionally, it may be determined that the polygon is greater than the threshold distance and/or the polygon may be discarded.

Alternatively and/or additionally, polygons of the source of polygons and/or entity listings associated with polygons of the source of polygons may be compared with known information (e.g., location information, address information, telephone number information, etc.) to determine a matching score between a polygon of the source of polygons and a set of known information associated with the polygon. For example, the set of known information may be entity information associated with the polygon that may be extracted from one or more sources (e.g., mapping systems, business listing services, etc. which may provide location information, address information, telephone number information, polygon information, etc. associated with an entity and/or a property corresponding to the polygon). Alternatively and/or additionally, responsive to a determination that the matching score between the polygon and the set of known information is greater than a threshold matching score the polygon may be added to the database of polygons and/or it may be determined that the polygon is accurate. Alternatively and/or additionally, responsive to a determination that the matching score between the polygon and the set of known information is less than the threshold matching score, the polygon may be discarded and/or it may be determined that the polygon is inaccurate.

At 404, a location database may be analyzed to identify a second location associated with the first property. For example, the location database may comprise a plurality of locations associated with a plurality of properties. For example, the location database may be associated with a mapping system (e.g., a web mapping service) which maps properties and/or entities to locations. For example, each location of the plurality of locations may comprise a set of coordinates (e.g., a longitude coordinate and/or a latitude coordinate) corresponding to a property of the plurality of properties. Alternatively and/or additionally, each location of the plurality of locations may be indicative of an entity associated with a property associated with the location (e.g., the location may comprise a set of coordinates associated with a property of the plurality of properties and/or may comprise an indication of an entity using the property).

In some examples, the second location may comprise a second set of coordinates associated with the first property. For example, the second set of coordinates may comprise a second longitude coordinate of the first property and/or a second latitude coordinate of the first property. The second set of coordinates may be indicative of a second center point (e.g., a centroid) of the first property and/or a different point of the first property. For example, the second set of coordinates may be indicative of the entrance associated with the first property (e.g., the entrance may be a doorway through which a person may enter the first property, a gate through which a person may enter the first property, etc.). Alternatively and/or additionally, the second set of coordinates may be indicative of a street location adjacent to the first property (e.g., the street location may be a point, on a street, that is adjacent to and/or in front of the first property and/or is adjacent to and/or in front of the storefront associated with the first property).

At 406, a first offset distance (e.g., feet, meters, etc.) may be determined based upon the first location associated with the first polygon and/or the second location associated with the first property. For example, the first offset distance may be indicative of a distance between the first location and/or the second location. For example, the first offset distance may be determined by performing an operation (e.g., a mathematical operation) using the first location (and/or the first set of coordinates) and/or the second location (and/or the second set of coordinates).

At 408, the database of polygons may be analyzed to determine an expected size of the first property based upon a plurality of polygons associated with the first entity. For example, the plurality of polygons may be selected from the database of polygons for analysis based upon a determination that each polygon of the plurality of polygons is associated with the first entity. For example, each polygon of the database of polygons may be indicative of an entity associated with the polygon (e.g., the database of polygons may comprise indications corresponding to entities associated with each polygon of the plurality of polygons).

In some examples, each polygon of the plurality of polygons may be associated with a property corresponding to the first entity. In a first example, the first entity may be a restaurant associated with a chain of restaurants (e.g., the first entity may be a branch of the chain of restaurants). Each polygon of the plurality of polygons may correspond to a property and/or a restaurant associated with the chain of restaurants (e.g., each polygon of the plurality of polygons may correspond to a branch of the chain of restaurants such that a first exemplary polygon of the plurality of polygons may be associated with a first branch of the chain of restaurants in a first exemplary city, such as Miami, Fla., and/or a second exemplary polygon of the plurality of polygons may be associated with a second branch of the chain of restaurants in a second exemplary city, such as Orlando, Fla.).

In a second example, the first entity may be a store associated with a chain of stores (e.g., a brand). For example, the first entity may be a department store associated with a chain of department stores (e.g., the first entity may be a branch of the chain of department stores). Each polygon of the plurality of polygons may correspond to a property and/or a department store of the chain of department stores (e.g., each polygon of the plurality of polygons may correspond to a branch of the chain of department stores such that a first exemplary polygon of the plurality of polygons may be associated with a first branch of the chain of department stores and/or a second exemplary polygon of the plurality of polygons may be associated with a second branch of the chain of department stores).

Alternatively and/or additionally, the plurality of polygons may be selected from the database of polygons for analysis based upon an entity category (e.g., clothing store entity, diner restaurant entity, coffee shop entity, men's haircut salon entity, etc.) associated with the first entity. For example, the plurality of polygons may be selected from the database of polygons for analysis based upon a determination that each polygon of the plurality of polygons is associated with the entity category (e.g., if the first entity is a men's haircut salon, then each polygon of the plurality of polygons may be associated with a men's haircut salon entity).

Alternatively and/or additionally, the plurality of polygons may be selected from the database of polygons for analysis based upon a first area density associated with the first polygon. For example, the first area density may correspond to a population density associated with (a region comprising) the first location and/or the second location. Alternatively and/or additionally, the first area density may correspond to an amount of structures per unit area associated with (a region comprising) the first location and/or the second location. Alternatively and/or additionally, the first area density may correspond to an average number of floors per structure associated with (a region comprising) the first location and/or the second location. Alternatively and/or additionally, the first area density may correspond to a measure of polygons per unit area associated with (a region comprising) the first location and/or the second location.

For example, the plurality of polygons may be selected from the database of polygons for analysis based upon a determination that each polygon of the plurality of polygons is associated with an area density related to the first area density associated with the first polygon. For example, each polygon of the plurality of polygons may be associated with an area density that is equal to the first area density. Alternatively and/or additionally, each polygon of the plurality of polygons may be associated with an area density that is within a threshold range of the first area density. In an example, the first location (and/or the second location) associated with the first polygon may be within a region having a high area density (e.g., the first location may be in Manhattan, N.Y.). Accordingly, each polygon of the plurality of polygons may be associated with a region having a high area density.

In some examples, the expected size may comprise an expected area of the first property. For example, the database of polygons (and/or the plurality of polygons) may be analyzed to determine a plurality of areas associated with the plurality of polygons. In some examples, an operation (e.g., a mathematical operation) may be performed using the plurality of areas to determine the expected area of the first property. The expected area of the first property may be a mean of the plurality of areas. For example, the plurality of areas may be averaged to determine the mean of the plurality of areas. Alternatively and/or additionally, the expected area of the first property may be a median of the plurality of areas.

Alternatively and/or additionally, the expected size may comprise an expected radius of the first property. For example, the database of polygons (and/or the plurality of polygons) may be analyzed to determine a plurality of radiuses associated with the plurality of polygons. In some examples, an operation (e.g., a mathematical operation) may be performed using the plurality of radiuses to determine the expected radius of the first property. The expected radius of the first property may be a mean of the plurality of radiuses. For example, the plurality of radiuses may be averaged to determine the mean of the plurality of radiuses. Alternatively and/or additionally, the expected radius of the first property may be a median of the plurality of radiuses.

Alternatively and/or additionally, the expected size may be determined based upon one or more sources of information different than the database of polygons. For example, the one or more sources of information may comprise property information associated with the first entity, blueprints associated with properties of the first entity, open source information comprising size information associated with properties of the first entity, etc. The one or more sources of information may be retrieved via one or more data sources and/or may be collected via data mining. The one or more sources of information may be used to determine the expected size (e.g., the expected area and/or the expected radius).

At 410, a size difference may be determined based upon the expected size of the first property and/or the first size associated with the first polygon. For example, an operation (e.g., a mathematical operation) may be performed using the expected size of the first property and/or the first size associated with the first polygon to determine the size difference. For example, the size difference may correspond to a combination of the first size and/or the expected size.

At 412, a quality score associated with the first polygon may be generated based upon the first offset distance and/or the size difference. For example, the quality score may be indicative of a level of accuracy and/or confidence of the first polygon representing the first property. Alternatively and/or additionally, the quality score may be indicative of whether the first polygon may be used to accurately determine whether a person visited the first entity and/or whether a person is interested in the first entity.

In some examples, the database of polygons may be analyzed to determine whether the first property and/or the first polygon are associated with one or more entities different than the first entity. For example, in an instance where the one or more entities and/or the first entity are associated with the first property, the first property may comprise a structure which is shared by the first entity and/or the one or more entities (e.g., the first property may be a mall structure and/or an office building comprising a plurality of stores and/or offices). For example, the database of polygons may comprise an indication of whether the first polygon is associated with the one or more entities.

Alternatively and/or additionally, the database of polygons may be analyzed to determine one or more other polygons (associated with the one or more entities) matching the first polygon. For example, the first location associated with the first polygon may be compared with polygon locations of other polygons of the database of polygons to determine the one or more other polygons. Alternatively and/or additionally, the first size associated with the first polygon may be compared with polygon sizes of other polygons of the database of polygons to determine the one or more other polygons. Alternatively and/or additionally, the first shape associated with the first polygon may be compared with polygon shapes of other polygons of the database of polygons to determine the one or more other polygons. Alternatively and/or additionally, one or more polygon identifiers of the first polygon (e.g., an identification number of the first polygon) may be compared with polygon identifiers of other polygons of the database of polygons to determine the one or more other polygons. For example, each polygon of the one or more other polygons may be associated with an entity of the one or more entities.

Alternatively and/or additionally, it may be determined that the one or more other polygons match the first polygon based upon a determination that an area of intersection, corresponding to an overlap of the first polygon at the first location with each polygon of the one or more other polygons at their respective locations, meets an area of intersection threshold (e.g., the area of intersection is greater than or equal to the area of intersection threshold). For example, the area of intersection threshold may be a percentage. For example, the area of intersection threshold may be 50%, 60%, 70%, 80%, 90%, 95%, 100%, and/or a different percentage. It may be appreciated that using a higher percentage (e.g., 90%) as the area of intersection threshold may result in more accurate determinations of whether the first polygon matches the one or more other polygons than using a lower percentage (e.g., 50%) as the area of intersection threshold. For example, it may be determined that a second polygon matches the first polygon based upon a determination that an area of intersection of the first polygon at the first location with the second polygon, at a location of the second polygon, meets the area of intersection threshold. For example, the area of intersection of the first polygon with the second polygon may meet the area of intersection threshold if the first polygon and the second polygon intersect at a first overlap region, where the first overlap region comprises an area of the first polygon that is greater than or equal to a first percentage (e.g., 50%, 60%, 70%, 80%, 90%, 95% and/or 100%) of the first polygon and/or the first overlap region comprises an area of the second polygon that is greater than or equal to a second percentage (e.g., 50%, 60%, 70%, 80%, 90%, 95% and/or 100%) of the second polygon. Alternatively and/or additionally, the area of intersection threshold may be an amount of area (e.g., square feet, square meters, etc.) of the first overlap region. Responsive to determining the one or more other polygons matching the first polygon, the one or more entities may be determined based upon the one or more other polygons (e.g., the one or more entities may comprise entities associated with the one or more other polygons matching the first polygon).

Alternatively and/or additionally, the location database may be analyzed to determine the one or more entities. For example, the location database may be analyzed to identify one or more entity locations that are within a second threshold distance from the second location (and/or the first location). For example, the second threshold distance may be determined based upon the expected size of the first property and/or the first size associated with the first polygon. For example, each entity location of the one or more entity locations may be associated with an entity of the one or more entities.

In some examples, the quality score may be generated based upon a quantity of entities of the one or more entities. For example, the quality score may be proportional (e.g., directly proportional, inversely proportional, etc.) to the quantity of entities of the one or more entities. In a first instance, the quantity of entities of the one or more entities may be a first quantity of entities and/or the quality score may be a first quality score. In a second instance, the quantity of entities of the one or more entities may be a second quantity of entities and/or the quality score may be a second quality score. The first quantity of entities may be greater than the second quantity of entities and/or the first quality score may be less than the second quality score.

Alternatively and/or additionally, it may be determined whether the first entity is a parent entity of the first property or a child entity of the first property. For example, the first entity being the parent entity of the first property may be indicative of the first property being mainly used by the first entity. In an example, the first entity may be a (large) department store and/or grocery store and/or the one or more entities may be (smaller) coffee shops, eye glasses stores, fast food restaurants, etc. Alternatively and/or additionally, the first entity being the child entity may mean that the first property is mainly used by a different entity (e.g., an entity of the one or more entities) and/or that the first entity uses a smaller portion of the first property than the different entity.

In some examples, it may be determined whether the first entity is the parent entity of the first property or the child entity of the first property based upon the size difference. For example, responsive to a determination that the size difference is less than a threshold size difference, the first entity may be determined to be the parent entity of the first property. Alternatively and/or additionally, responsive to a determination that the size difference is greater than a threshold size difference, the first entity may be determined to be the child entity of the first property. Alternatively and/or additionally, responsive to a determination that the expected size of the first property is greater than the first size associated with the first polygon, the first entity may be determined to be the parent entity of the first property.

Alternatively and/or additionally, a containment database may be analyzed to determine whether the first entity is the parent entity of the first property or the child entity of the first property. For example, the containment database may comprise a plurality of sets of containment information, where each set of containment information of the plurality of sets of containment information is indicative of a parent to child relationship pattern associated with a set of entities. For example, a parent to child relationship pattern may be indicative of a first parent entity of the set of entities and/or one or more child entities of the set of entities. Alternatively and/or additionally, each set of containment information of the plurality of sets of containment information may comprise a parent identifier indicative of a first parent entity of a set of entities, a child identifier indicative of a first child entity of the set of entities, a parent category identifier indicative of a first category (e.g., clothing store entities, shopping mall entities, business plaza entities, etc.) of the first parent entity and/or a child category identifier indicative of a second category of the first child entity.

For example, the containment database may be analyzed to identify a first set of containment information associated with the first entity. In a first instance, the first set of containment information may be indicative of a first parent to child relationship pattern associated with the first entity and/or one or more second entities. The first entity may be the parent entity of properties associated with the first entity. The one or more second entities (which may comprise one or more of the one or more entities) may be child entities of the properties associated with the first entity.

Alternatively and/or additionally, it may be determined that the containment database does not comprise containment information associated with the first entity. In some examples, the containment database may be analyzed based upon the entity category of the first entity. For example, it may be determined that the first set of containment information comprises a parent category identifier associated with the entity category of the first entity. It may be determined that the first entity is the parent entity based upon the parent category identifier associated with the entity category of the first entity.

In some examples, entities of the one or more entities (associated with the one or more other polygons that match the first polygon associated with the first entity) that are also included in the one or more second entities (e.g., child entities of the properties associated with the first entity) may not be counted when determining the quantity of entities. For example, if the one or more entities (that share the first property with the first entity) comprises an Eye Glasses Central entity, a Danny's Diner entity, an Alphabet Soup entity and a Sammy's Coffee entity (e.g., four entities) and the one or more second entities (e.g., entities defined as child entities of the properties for which the first entity is the parent entity) comprises the Danny's Diner entity and the Sammy's Coffee entity (e.g., two of the entities included in the one or more entities are already defined as being child entities relative to the first entity), then the quantity of entities may be two (e.g., because the Danny's Diner entity and the Sammy's Coffee entity are not counted when determining the quantity of entities of the one or more entities, because the Danny's Diner entity and the Sammy's Coffee entity are already defined as child entities relative to the first entity). Thus, by decreasing the quantity of entities (by excluding, from the count, entities that are already defined as child entities relative to the first entity), the quality score associated with the first polygon may be increased.

In a second instance, the first set of containment information may be indicative of a second parent to child relationship pattern associated with the first entity. A third entity may be the parent entity of properties associated with the third entity. One or more third entities, comprising the first entity, may be child entities of the properties associated with the third entity.

Alternatively and/or additionally, if the containment database does not comprise containment information associated with the first entity, the containment database may be analyzed based upon the entity category of the first entity. For example, it may be determined that the first set of containment information comprises a child category identifier associated with the category of the first entity. It may be determined that the first entity is the child entity based upon the child category identifier associate with the entity category of the first entity.

In some examples, the containment database may be generated and/or updated by determining shared properties that are shared amongst more than one entity (e.g., such that more than one entity is located at each shared property) and/or by determining parent to child relationship patterns associated with the shared properties. For example, a third polygon of the database of polygons may be identified. The third polygon may comprise a representation of geographical boundaries of a second property associated with a fourth entity.

In some examples, the database of polygons may be analyzed to determine one or more second polygons matching the third polygon (e.g., the one or more second polygons may be determined by comparing a location associated with the third polygon with polygon locations of other polygons of the database of polygons, by comparing a size associated with the third polygon with polygon sizes of other polygons of the database of polygons, by comparing a shape of the third polygon with polygon shapes of other polygons of the database of polygons, by comparing a polygon identifier of the third polygon with polygon identifiers of other polygons of the database of polygons, by determining that an area of intersection of the third polygon with each polygon of the one or more second polygons meet the area of intersection threshold).

Responsive to determining the one or more second polygons, one or more fourth entities associated with the one or more second polygons may be determined. For example, the one or more fourth entities and/or the fourth entity may be determined to share the second property (e.g., the second property may contain the one or more fourth entities and/or the fourth entity). For example, it may be determined that the fourth entity is a second parent entity of the second property and/or that the one or more fourth entities are second child entities of the second property. For example, the fourth entity may be determined to be the second parent entity of the second property by determining a second expected size associated of the second property (based upon sizes of polygons associated with the fourth entity) and/or determining that a second size difference between the second expected size and the size of the third polygon is less than the threshold size difference.

In some examples, a second parent to child relationship pattern associated with the fourth entity may be generated responsive to determining that more than a threshold number of properties (e.g., 20 properties, 50 properties, 75 properties, etc.) are shared by the one or more fourth entities and/or the fourth entity (which may be determined by analyzing the database of polygons). For example, the second parent to child relationship pattern may be indicative of the fourth entity being the second parent entity of properties associated with the fourth entity and/or the one or more fourth entities being the second child entities of the properties associated with the fourth entity.

In some examples, the quality score may be generated based upon whether the first entity is the parent entity of the first property and/or the child entity of the first property. For example, responsive to a determination that the first entity is the parent entity of the first property, the quality score may be a third quality score. Alternatively and/or additionally, responsive to a determination that the first entity is the child entity of the first property, the quality score may be a fourth quality score. The third quality score may be greater than the fourth quality score (or may be less than the fourth quality score).

Alternatively and/or additionally, the quality score may be generated based upon the first offset distance. In some examples, a weight may be applied to the first offset distance based upon the expected size of the first property to generate a weighted offset distance. For example, the weight may be generated based upon the expected radius and/or the expected area. For example, the weight may be equal to 1 divided by a product of the expected radius and 2 (and/or a different combination). Alternatively and/or additionally, the weight may be equal to 1 divided by a product of the expected area and 2 (and/or a different combination). In some examples, the weight may be applied to the first offset distance by multiplying the first offset distance by the weight (and/or performing a different operation). Alternatively and/or additionally, the weighted offset distance may be generated by combining the first offset distance with the expected radius and/or the expected area. Alternatively and/or additionally, an expected diameter may be determined based upon the expected radius (e.g., the expected diameter may be equal to the expected radius multiplied by 2). For example, the weighted offset distance may be generated by dividing the first offset distance by the expected radius and/or the expected diameter (and/or by performing a different mathematical operation using the first offset distance, the expected radius, the expected diameter and/or the expected area). Alternatively and/or additionally, the weighted offset distance may be generated by dividing the first offset distance by the expected area (and/or by performing a different operation using the first offset distance, the expected area and/or the expected radius).

In some examples, the quality score may be generated based upon the weighted offset distance. In a first instance, the weighted offset distance may be determined to be a first weighted offset distance and/or the quality score may be a fifth quality score. In a second instance, the weighted offset distance may be determined to be a second weighted offset distance and/or the quality score may be a sixth quality score. For example, the first weighted offset distance may be greater than the second weighted offset distance and/or the fifth quality score may be less than the sixth quality score.

Alternatively and/or additionally, the weighted offset distance may be compared with a threshold weighted offset distance (e.g., 0.3, 0.4, 0.5, etc.). For example, responsive to a determination that the weighted offset distance is greater than the threshold weighted offset distance, the first polygon may be discarded and/or may not be used to determine whether a person visited the first property and/or the first entity. Alternatively and/or additionally, responsive to a determination that the weighted offset distance is greater than the threshold weighted offset distance, the first polygon may (automatically) be modified to generate a first modified polygon based upon one or more satellite images associated with the first location and/or the second location, one or more aerial photography images associated with the first location and/or the second location, the second location and/or the expected size. For example, one or more image analysis techniques may be used to identify edges of the first property using the one or more satellite images and/or the one or more aerial photography images. The edges may be used to generate the first modified polygon.

Alternatively and/or additionally, responsive to the determination that the weighted offset distance is greater than the threshold weighted offset distance, a second graphical user interface of a second client device may be controlled to display a message indicative of the weighted offset distance being greater than the threshold weighted offset distance. For example, the second client device may be associated with an administrator (e.g., an engineer, a technician, a person who is tasked with designing polygons and/or making decisions associated with the database of polygons, etc.).

For example, the message may comprise a first selectable input corresponding to discarding the first polygon. Responsive to a selection of the first selectable input, the first polygon may be discarded and/or may not be used to determine whether a person visited the first property and/or the first entity. Alternatively and/or additionally, responsive to a selection of the first selectable input, the second graphical user interface of the second client device may be controlled to display a polygon generation interface. The polygon generation interface may comprise one or more first selectable inputs associated with generating a fourth polygon associated with the first property and/or the first entity. For example, a shape of the fourth polygon, a size of the fourth polygon, a location of the fourth polygon, etc. may be configured using the one or more first selectable inputs. One or more first inputs may be received from the second client device via the polygon generation interface. The fourth polygon may be generated based upon the one or more first inputs.

Alternatively and/or additionally, the message may comprise a second selectable input corresponding to editing the first polygon. In some examples, responsive to a selection of the second selectable input, the second graphical user interface of the second client device may be controlled to display a polygon editing interface. For example, the polygon editing interface may comprise a representation of the first polygon, one or more satellite images associated with the first location and/or the second location, one or more aerial photography images associated with the first location and/or the second location, and/or one or more second selectable inputs associated with editing the first polygon. One or more second inputs may be received via the polygon editing interface. For example, the one or more second inputs may correspond to modifications to the first polygon, such as modifications to the first size associated with the first polygon, modifications to the first location associated with the first polygon, modifications to the first shape associated with the first polygon and/or modifications to one or more other characteristics of the first polygon. For example, responsive to receiving the one or more second inputs, the first polygon may be modified based upon the one or more second inputs to generate a second modified polygon.

Alternatively and/or additionally, the message may comprise a third selectable input corresponding to not discarding the first polygon. For example, responsive to a selection of the third selectable input, the first polygon may not be discarded and/or may be used to determine whether a person visited the first property and/or the first entity. For example, responsive to the selection of the third selectable input, the first polygon may be added to a database of accurate polygons. Locations of client devices may be compared with polygons of the database of accurate polygons to determine which properties and/or entities are visited by people.

Alternatively and/or additionally, the quality score may be generated based upon the size difference. For example, the size difference may comprise an area difference and/or a radius difference. For example, the area difference may be determined based upon the expected area of the first property and/or the first area associated with the first polygon. An operation (e.g., a mathematical operation) may be performed using the expected area of the first property and/or the first area associated with the first polygon to determine the area difference. For example, the area difference may correspond to (a magnitude of) a difference between the expected area and the first area. Alternatively and/or additionally, the area difference may correspond to a combination of the expected area and the first area (e.g., the area difference may be equal to the first area divided by a product of the expected area and 2 (and/or a different combination of the expected area and the first area)).

In some examples, the quality score may be generated based upon the area difference. In a first instance, the area difference may be determined to be a first area difference and/or the quality score may be a seventh quality score. In a second instance, the area difference may be determined to be a second area difference and/or the quality score may be an eighth quality score. For example, the first area difference may be greater than the second area difference and/or the seventh quality score may be less than the eighth quality score. In some examples, the seventh quality score may be greater than the eighth quality score.

Alternatively and/or additionally, the area difference may be compared with a first threshold area difference (e.g., 0.1, 0.15, 0.2, 0.25, 0.3, 0.35, 0.4, 0.45, etc.) and/or a second threshold area difference (e.g., 0.55, 0.6, 0.65, 0.7, 0.75, 0.8, 0.85, 0.9, etc.). For example, the first threshold area difference may be a minimum area threshold. Alternatively and/or additionally, the second threshold area difference may be a maximum area threshold. For example, responsive to a determination that the area difference is less than the first threshold area difference or greater than the second threshold area difference, the first polygon may be discarded and/or the first polygon may not be used to determine whether a person visited the first property and/or the first entity. Alternatively and/or additionally, responsive to the determination that the area difference is less than the first threshold area difference or greater than the second threshold area difference, the first polygon may be modified to generate a third modified polygon. Alternatively and/or additionally, responsive to the determination that the area difference is less than the first threshold area difference or greater than the second threshold area difference, the second graphical user interface of the second client device may be controlled to display a second message indicative of the area difference being less than the first threshold area difference and/or greater than the second threshold area difference. For example, the second message may comprise the first selectable input, the second selectable input and/or the third selectable input.

Alternatively and/or additionally, the radius difference may be determined based upon the expected radius of the first property and/or the first radius associated with the first polygon. For example, an operation (e.g., a mathematical operation) may be performed using the expected radius of the first property and/or the first radius associated with the first polygon to determine the radius difference. For example, the radius difference may correspond to (a magnitude of) a difference between the expected radius and the first radius. Alternatively and/or additionally, the radius difference may correspond to a combination of the expected radius and the first radius (e.g., the radius difference may be equal to the first radius divided by a product of the expected radius and 2 (and/or a different combination of the expected radius and the first radius)).

In some examples, the quality score may be generated based upon the radius difference. In a first instance, the radius difference may be determined to be a first radius difference and/or the quality score may be a ninth quality score. In a second instance, the radius difference may be determined to be a second radius difference and/or the quality score may be a tenth quality score. For example, the first radius difference may be greater than the second radius difference and/or the ninth quality score may be less than the tenth quality score (and/or the ninth quality score may be greater than the tenth quality score).

Alternatively and/or additionally, the radius difference may be compared with a first threshold radius difference (e.g., 0.1, 0.15, 0.2, 0.25, 0.3, 0.35, 0.4, 0.45, etc.) and/or a second threshold radius difference (e.g., 0.55, 0.6, 0.65, 0.7, 0.75, 0.8, 0.85, 0.9, etc.). For example, the first threshold radius difference may be a minimum radius threshold. Alternatively and/or additionally, the second threshold radius difference may be a maximum radius threshold.

Responsive to a determination that the radius difference is less than the first threshold radius difference or greater than the second threshold radius difference, the first polygon may be discarded and/or the first polygon may not be used to determine whether a person visited the first property and/or the first entity. Alternatively and/or additionally, responsive to the determination that the radius difference is less than the first threshold radius difference or greater than the second threshold radius difference, the first polygon may be modified to generate a fourth modified polygon. Alternatively and/or additionally, responsive to the determination that the radius difference is less than the first threshold radius difference or greater than the second threshold radius difference, the second graphical user interface of the second client device may be controlled to display a third message indicative of the radius difference being less than the first threshold radius difference and/or greater than the second threshold radius difference. For example, the third message may comprise the first selectable input, the second selectable input and/or the third selectable input.

Alternatively and/or additionally, the quantity of entities may be compared with a threshold quantity of entities (e.g., the threshold quantity of entities may be 10 entities, 15 entities, 20 entities, etc.). For example, responsive to a determination that the quantity of entities is greater than the threshold quantity of entities, the first polygon may be discarded and/or may not be used to determine whether a person visited the first property and/or the first entity. For example, the quantity of entities being greater than the threshold quantity of entities may be indicative of the first property comprising a structure, such as a shopping center, a business center, a mall, etc. shared amongst the one or more entities and/or the first entity.

For example, if the quantity of entities is greater than the threshold quantity of entities and/or an indication that a location of the client device and/or the user is within the first polygon is received, it may be difficult to determine which entity, from amongst the one or more entities and the first entity, the user visited (e.g., the first entity may be inside of a large shopping center comprising numerous entities where it may be difficult to determine whether the user visited the first entity or a different entity based upon a determination that the user is within the large shopping center). Alternatively and/or additionally, responsive to the determination that the quantity of entities is greater than the threshold quantity of entities, the one or more other polygons (associated with the one or more entities) may be discarded and/or may not be used to determine whether a person visited the first property and/or the one or more entities.

Alternatively and/or additionally, responsive to a determination that the first entity is the child entity of the first property, the first polygon may be discarded and/or may not be used to determine whether a person visited the first entity. Alternatively and/or additionally, responsive to a determination that the one or more entities are the child entities of the first property, the one or more other polygons may be discarded and/or may not be used to determine whether a person visited the one or more entities.

Alternatively and/or additionally, a radius standard deviation may be generated based upon the plurality of radiuses. For example, an operation (e.g., a mathematical operation) may be performed to determine the radius standard deviation associated with the first entity (e.g., the radius standard deviation may correspond to a standard deviation of the plurality of radiuses). In some examples, the quality score may be generated based upon the radius standard deviation. In a first instance, the radius standard deviation may be determined to be a first radius standard deviation and/or the quality score may be an eleventh quality score. In a second instance, the radius standard deviation may be determined to be a second radius standard deviation and/or the quality score may be a twelfth quality score. For example, the first radius standard deviation may be greater than the second radius standard deviation and/or the eleventh quality score may be less than the twelfth quality score.

Alternatively and/or additionally, the radius standard deviation may be compared with a threshold radius standard deviation. Responsive to a determination that the radius standard deviation is greater than the threshold radius standard deviation, the first polygon may be discarded and/or may not be used to determine whether a person visited the first property and/or the first entity. For example, the radius standard deviation being greater than the threshold radius standard deviation may be indicative of polygons associated with the first entity having inconsistent sizes.

Alternatively and/or additionally, an area standard deviation may be generated based upon the plurality of areas. For example, an operation (e.g., a mathematical operation) may be performed to determine the area standard deviation associated with the first entity (e.g., the area standard deviation may correspond to a standard deviation of the plurality of areas). In some examples, the quality score may be generated based upon the area standard deviation. In a first instance, the area standard deviation may be determined to be a first area standard deviation and/or the quality score may be a thirteenth quality score. In a second instance, the area standard deviation may be determined to be a second area standard deviation and/or the quality score may be a fourteenth quality score. For example, the first area standard deviation may be greater than the second area standard deviation and/or the thirteenth quality score may be less than the fourteenth quality score.

Alternatively and/or additionally, the area standard deviation may be compared with a threshold area standard deviation. Responsive to a determination that the area standard deviation is greater than the threshold area standard deviation, the first polygon may be discarded and/or may not be used to determine whether a person visited the first property and/or the first entity. For example, the area standard deviation being greater than the threshold area standard deviation may be indicative of polygons associated with the first entity having inconsistent sizes.

In some examples, the quality score may be generated using machine learning techniques. For example, the machine learning techniques may be performed using one or more random forest classification and/or regression techniques, one or more logistic regression techniques, one or more decision tree model techniques, one or more grid search techniques with cross-validation, one or more randomized search techniques with cross-validation, one or more k-fold cross validation techniques, one or more hyper parameter tuning techniques, one or more active learning techniques, one or more transfer learning techniques, one or more deep learning neural net techniques (e.g., using a deep learning neural net classifier), etc. Alternatively and/or additionally, machine learning models associated with the machine learning techniques may be tuned by performing hyper parameter tuning. Alternatively and/or additionally, cross validations, precision inclinations, train test splits, random seeds, feature scaling, etc. may be applied to the machine learning models to select a most effective machine learning model from the machine learning models. For example, the machine learning techniques may use a random forest classifier based binary classifier machine learning model, which may be used to achieve an improved polygon selection precision (e.g., of about 94%) and/or an improved polygon selection recall (e.g., of about 84%).

In some examples, a set of polygons of the database of accurate polygons may be presented using one or more client devices such that the set of polygons may undergo a manual checking process. For example, the one or more client devices may be associated with one or more administrators (e.g., one or more editors, one or more engineers, one or more technicians, one or more people tasked with designing polygons and/or making decisions associated with the database of accurate polygons, etc.). For example, instructions associated with the manual checking process may be displayed using the one or more client devices.

For example, the instructions may be indicative of guidelines for determining whether a polygon of the set of polygons is an acceptable polygon and/or whether a polygon of the set of polygons is an unacceptable polygon. In some examples, the instructions may indicate that a polygon of the set of polygons is an acceptable polygon if the polygon is larger than an actual size of a corresponding property and/or a corresponding entity, if the polygon does not overlap one or more properties and/or entities different than the corresponding property and/or the corresponding entity, and/or if an exemplary size difference between a polygon size of the polygon and a size associated with the corresponding property and/or the corresponding entity is determined to be less than an exemplary size difference threshold.

Alternatively and/or additionally, the instructions may indicate that a polygon of the set of polygons is an acceptable polygon if the polygon is smaller than an actual size of a corresponding property and/or a corresponding entity and/or if an exemplary size difference between a polygon size of the polygon and a size associated with the corresponding property and/or the corresponding entity is determined to be less than an exemplary size difference threshold. Alternatively and/or additionally, the instructions may indicate that a polygon of the set of polygons is an acceptable polygon if a polygon location of the polygon is within an exemplary threshold distance of a location of a corresponding property and/or a corresponding entity, if an exemplary size difference between a polygon size of the polygon and a size associated with the corresponding property and/or the corresponding entity is determined to be less than an exemplary size difference threshold and/or if a shape of the polygon is different than a shape of the corresponding property and/or the corresponding entity.

In some examples, a set of decisions corresponding to the set of polygons may be received from the one or more client devices associated with the one or more administrators. For example, each decision of the set of decisions may correspond to whether a polygon of the set of polygons is acceptable and/or unacceptable. For example, the polygon selection precision and/or the polygon selection recall may be determined based upon the set of decisions. Alternatively and/or additionally, decisions of the set of decisions that correspond to unacceptable polygons may comprise indications of reasons that the unacceptable polygons are determined to be unacceptable (e.g., an exemplary polygon size is too large, an exemplary offset distance is too high, etc.). Alternatively and/or additionally, the set of decisions may be used as a training set to train one or more (machine learning) models (e.g., such as a model using a deep learning neural net classifier) and/or increase polygon selection precision and/or polygon selection recall of the one or more models.

For example, the machine learning techniques may be used to generate the quality score based upon the first offset distance, the weighted offset distance, the size difference, the area difference, the radius difference, the quantity of entities, whether the first entity is the parent entity of the first property or the child entity of the first property, the containment database, the radius standard deviation, the area standard deviation, etc.

Alternatively and/or additionally, the quality score may be compared with a threshold quality score. For example, responsive to a determination that the quality score is less than the threshold quality score, the first polygon may be discarded and/or may not be used to determine whether a person visited the first property and/or the first entity. Alternatively and/or additionally, responsive to the determination that the quality score is less than the threshold quality score, the first polygon may (automatically) be modified to generate a fifth modified polygon. Alternatively and/or additionally, responsive to the determination that the quality score is less than the threshold quality score, the second graphical user interface of the second client device may be controlled to display a fourth message indicative of the quality score being less than the threshold quality score. For example, the fourth message may comprise the first selectable input, the second selectable input and/or the third selectable input.

Alternatively and/or additionally, responsive to a determination that the quality score is greater than the threshold quality score, the first polygon may not be discarded and/or may be used to determine whether a person visited the first property and/or the first entity. For example, responsive to the determination that the quality score is greater than the threshold quality score, the first polygon may be added to the database of accurate polygons.

For example, a location message may be received from the client device associated with the user. For example, the location message may comprise an indication of a location of the user and/or the client device. For example, the location of the user and/or the client device may be compared with the database of accurate polygons (and/or the database of polygons) to determine that the location of the user and/or the client device is within the first polygon and/or within the threshold distance from the first polygon. In some examples, responsive to determining that the location of the user and/or the client device is within the first polygon and/or within the threshold distance from the first polygon, a first content item may be transmitted to the client device.

For example, the first content item may be a notification (e.g., a push notification), an email transmitted to an email account associated with the client device, a message (e.g., an instant messaging message and/or a text message), etc. In some examples, the first content item may be associated with the first entity. For example, a subject matter of the first content item may be associated with the entity category associated with the first entity (e.g., if the first entity is a car store, the first content item may comprise content associated with cars such as cars that are available for purchase from the first entity and/or a different entity, if the first entity is a coffee shop, the first content item may comprise content associated with coffee, such as coffee that is available for purchase from the first entity and/or a different entity, etc.). Alternatively and/or additionally, the first content item may comprise information corresponding to the first entity (e.g., the first content item may comprise indications of items that are available for purchase from the first entity at reduced prices, the first content item may comprise indications of items that are available for purchase from the first entity, etc.). In some examples, the first content item may be transmitted to the client device while the location of the user and/or the client device is within the first polygon and/or within the threshold distance from the first polygon.

It may be appreciated that the disclosed subject matter may not be limited to being used merely for the content system. For example, the disclosed subject matter may be used for generating accurate maps and/or outlines of areas comprising representations of properties (e.g., structures, buildings, fields, etc.) and/or entities (e.g., schools, waste plants, companies, stores), which may be used for a variety of purposes (e.g., planning school zones, planning construction of buildings and/or roads, etc.). Alternatively and/or additionally, the disclosed subject matter may be used for any systems requiring polygons that accurately represent properties.

Figure 5A:
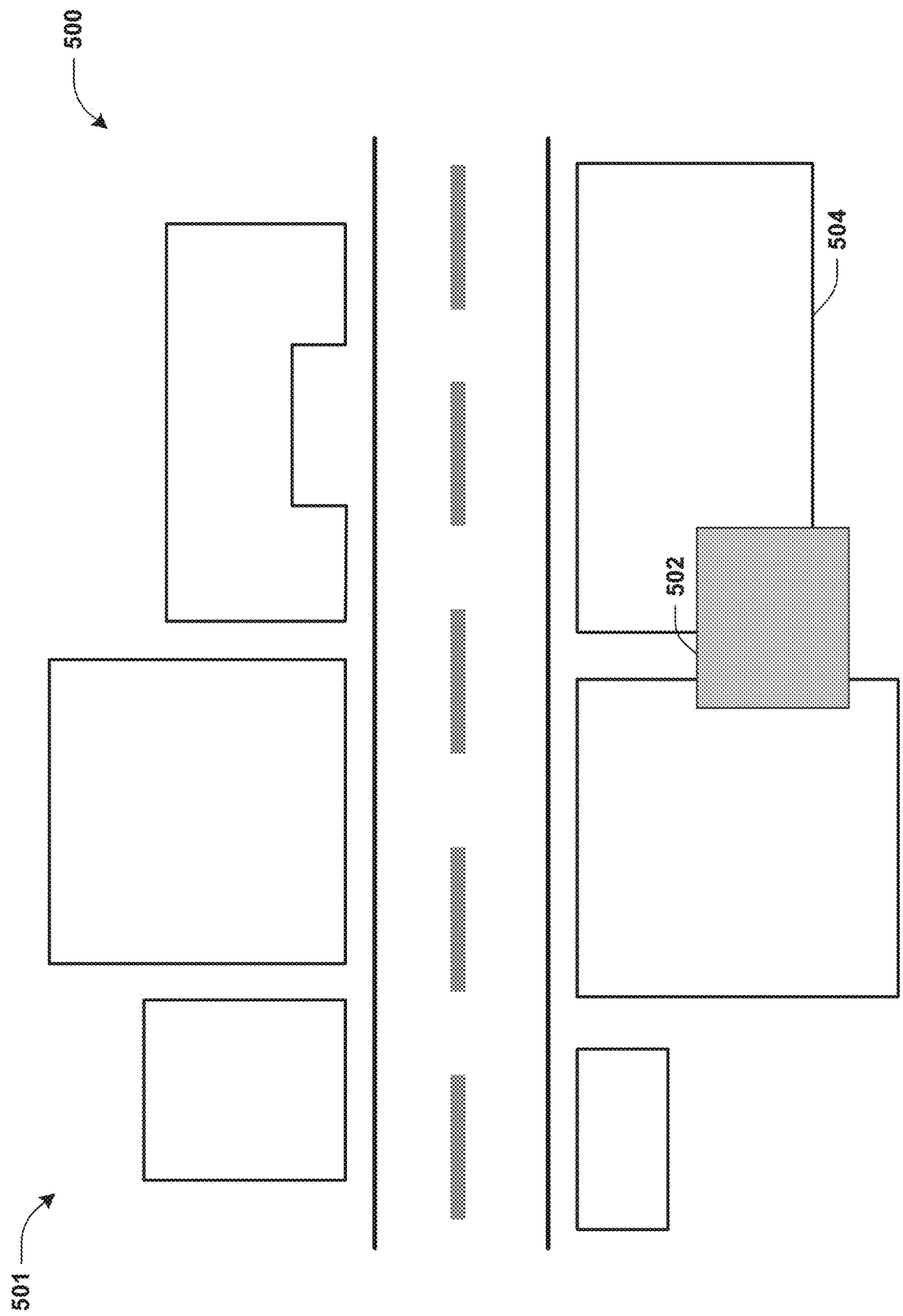
FIG. 5A is a component block diagram, illustrating an example system for identifying polygons that are accurate representations of geographical boundaries of properties associated with entities, comprising a map view of a first polygon comprising a representation of geographical boundaries of a first property associated with a first entity.

FIGS. 5A-5H illustrate examples of a system 501 for identifying polygons that are accurate representations of geographical boundaries of properties associated with entities. FIG. 5A illustrates a map view 500 (e.g., a map) comprising a first polygon 502 comprising a representation (e.g., a geometrical representation) of geographical boundaries of a first property 504 associated with a first entity. For example, the first polygon 502 may be selected from a database of polygons in order to check whether the first polygon 502 is an accurate representation of the first property 504 and/or the first entity. For example, the first entity may be a department store "JJ's Department Store". The first property 504 may comprise a structure, a building, a construct, a field, a parking lot, etc. The first polygon 502 may be an inaccurate representation of the first property 504 (e.g., the first polygon 502 is smaller than the first property 504, a location of the first polygon 502 is different than a location of the first property 504, etc.).

In some examples, the first polygon 502 may be compared with client locations of client devices associated with users to determine users that visited the first entity and/or the first property. However, because the first polygon 502 inaccurately represents the first property 504, it may be mistakenly determined that one or more first users visited the first property 504 when in actuality, the one or more first users did not visit the first property 504. Alternatively and/or additionally, it may not be determined that one or more second users visited the first property 504, when in actuality, the one or more second users did visit the first property 504.

Figure 5B:
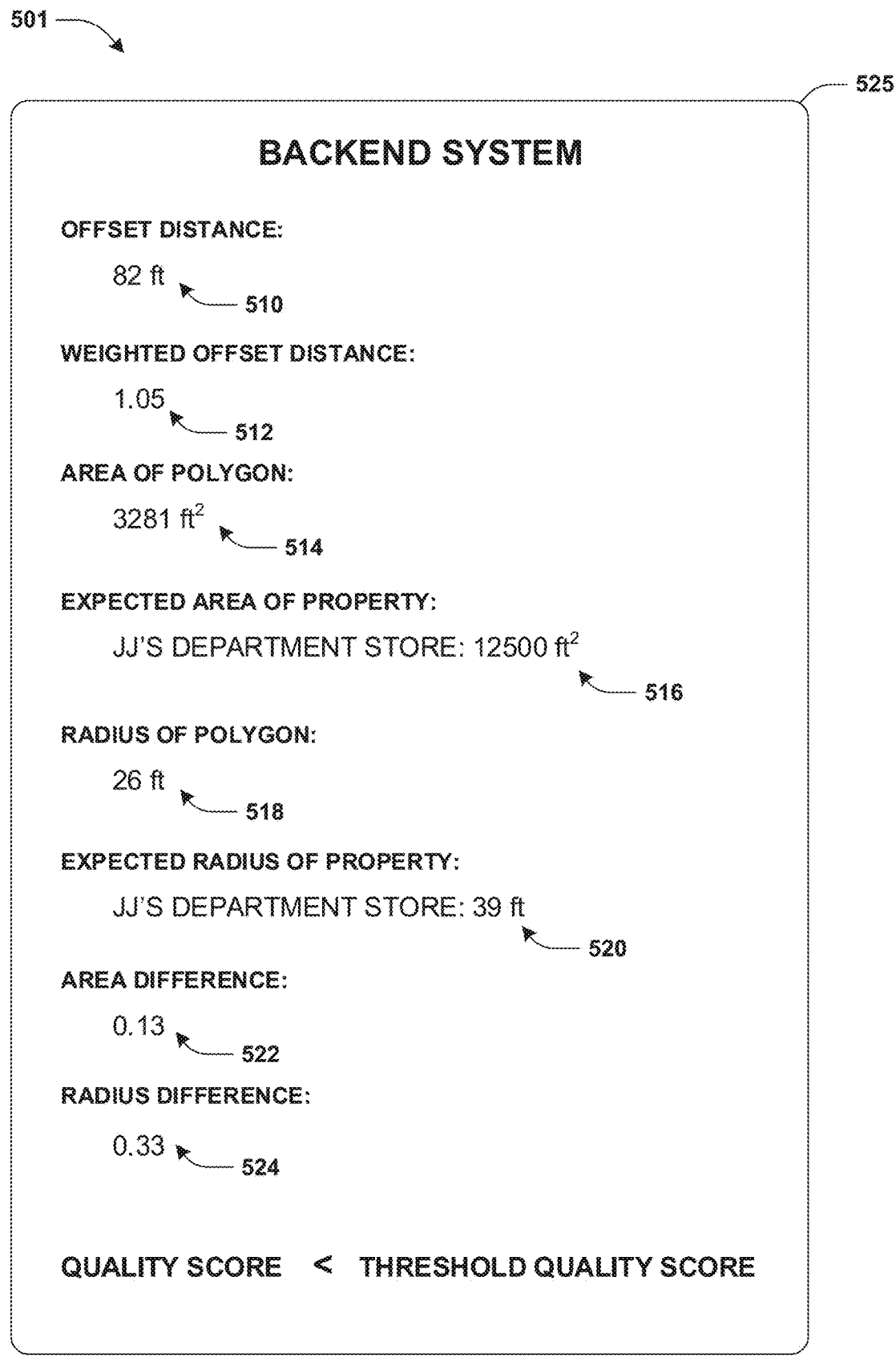
FIG. 5B is a component block diagram illustrating an example system for identifying polygons that are accurate representations of geographical boundaries of properties associated with entities, where a backend system generates a first quality score associated with a first polygon.
Figure 5C:
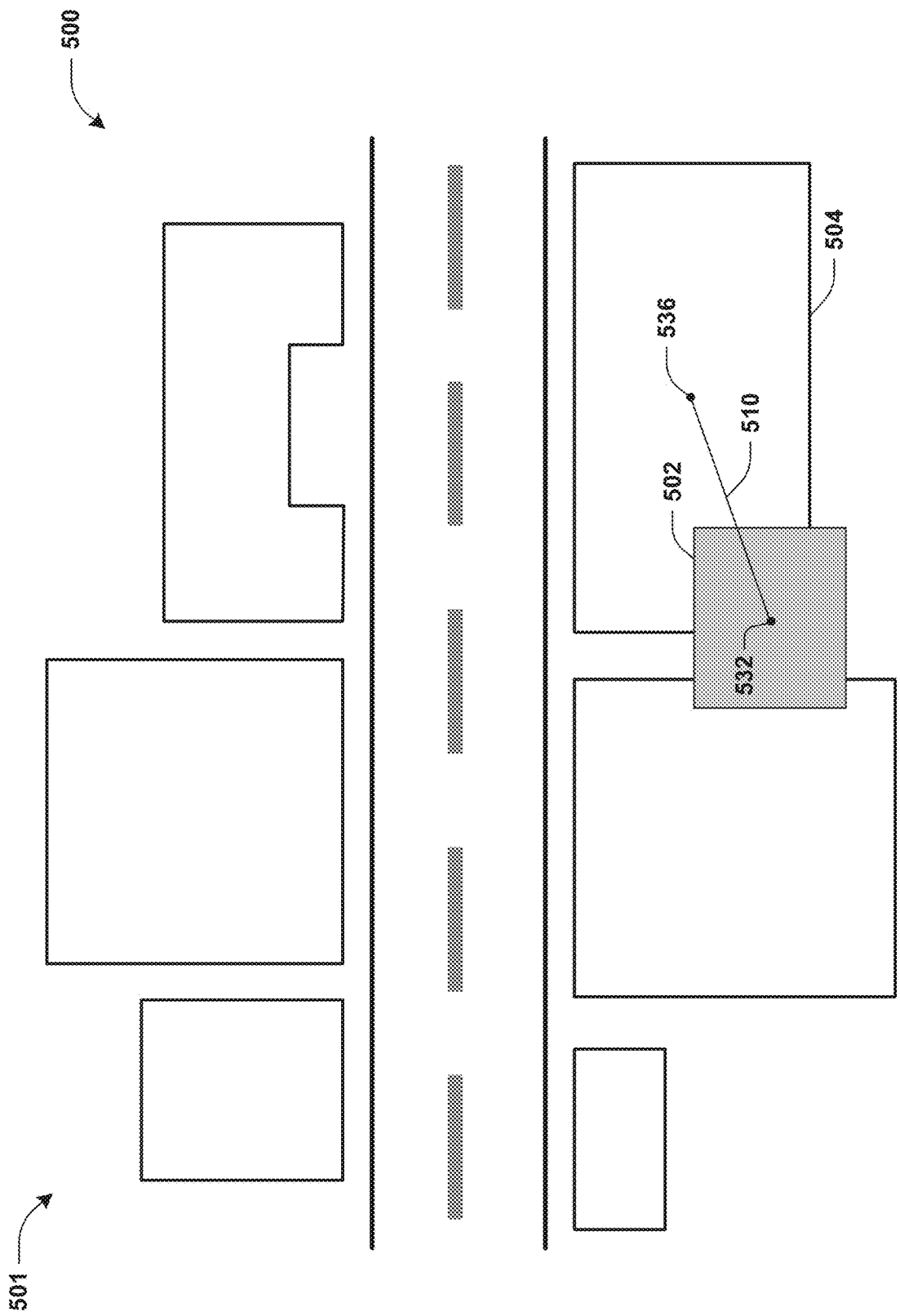
FIG. 5C is a component block diagram illustrating an example system for identifying polygons that are accurate representations of geographical boundaries of properties associated with entities, where a first offset distance is determined.

FIG. 5B illustrates a backend system 525 generating a first quality score associated with the first polygon 502. For example, a first offset distance 510 may be determined. FIG. 5C illustrates the first offset distance 510 being determined. For example, a first location 532 associated with the first polygon 502 may be compared with a second location 536 associated with the first property 504. For example, the second location 536 may be identified by analyzing a location database comprising a plurality of locations associated with a plurality of properties. For example, the first location 532 may be indicative of a first center point (e.g., a centroid) of the first polygon 502. Alternatively and/or additionally, the second location 536 may correspond to a second center point (e.g., a centroid) of the first property 504. The first offset distance 510 may correspond to a distance between the first location 532 and the second location 536. In some examples, the first offset distance 510 (e.g., 82 feet) may be determined by performing an operation (e.g., a mathematical operation) using the first location 532 and the second location 536.

Alternatively and/or additionally, a first weighted offset distance 512 may be generated based upon the first offset distance 510 and/or a first expected radius 520 of the first property 504 (e.g., 39 feet). For example, the first weighted offset distance 512 may be generated by combining the first offset distance 510 with the first expected radius 520. For example, the first weighted offset distance 512 may be generated by dividing the first offset distance 510 (e.g., 82 feet) by a product of the first expected radius 520 (e.g., 39 feet) and 2

$$\left(\text{e.g., } \frac{82}{39 \times 2} = 1.05\right).$$

Alternatively and/or additionally, a first expected area 516 of the first property 504 (e.g., 12,500 square feet) may be determined based upon the database of polygons. For example, the database of polygons may be analyzed based upon the first entity to identify a plurality of polygons associated with the first entity. For example, an operation (e.g., a mathematical operation) may be performed using a plurality of areas of the plurality of polygons to determine the first expected area 516 of the first property 504. For example, the first expected area 516 may be a median (and/or a mean) of the plurality of areas. Alternatively and/or additionally, the first expected radius 520 may be determined based upon the plurality of polygons. For example, an operation (e.g., a mathematical operation) may be performed using a plurality of radiuses of the plurality of polygons to determine the first expected radius 520 of the first property 504. For example, the first expected radius 520 of the first property 504 may be a median (and/or a mean) of the plurality of radiuses.

In some examples, a first area 514 (e.g., 3,281 square feet) associated with the first polygon 502 may be combined with the first expected area 516 to determine a first area difference 522 (e.g., 0.13). For example, the first area difference 522 may be generated by dividing the first area 514 (e.g., 3,281 square feet) by a product of the first expected area 516 (e.g., 12,500 square feet) and 2

$$\left(\text{e.g., } \frac{3281}{12500 \times 2} = 0.13\right).$$

In some examples, if the first area 514 matches the first expected area 516, the first area difference 522 may be 0.5.

Alternatively and/or additionally, a first radius 518 (e.g., 26 feet) associated with the first polygon 502 may be combined with the first expected radius 520 to determine a first radius difference 524 (e.g., 0.33). For example, the first radius difference 524 may be generated by dividing the first radius 518 (e.g., 26 feet) by a product of the first expected radius 520 (e.g., 39 feet) and 2

$$\left(\text{e.g., } \frac{26}{39 \times 2} = 0.33\right).$$

In some examples, if the first radius 518 matches the first expected radius 520, the first radius difference 524 may be 0.5.

In some examples, the first quality score may be generated based upon the first offset distance 510, the first weighted offset distance 512, the first area 514, the first expected area 516, the first radius 518, the first expected radius 520, the first area difference 522 and/or the first radius difference 524. For example, the first quality score may be generated using one or more machine learning techniques. Alternatively and/or additionally, the first quality score may be compared with a threshold quality score. For example, it may be determined that the first quality score is less than the threshold quality score. Responsive to determining that the first quality score is less than the threshold quality score, the first polygon 502 may be discarded and/or may not be used to determine whether a person visited the first property 504 and/or the first entity. Alternatively and/or additionally, the first polygon may (automatically) be modified to generate a second polygon 548 (illustrated in FIG. 5E).

Figure 5D:
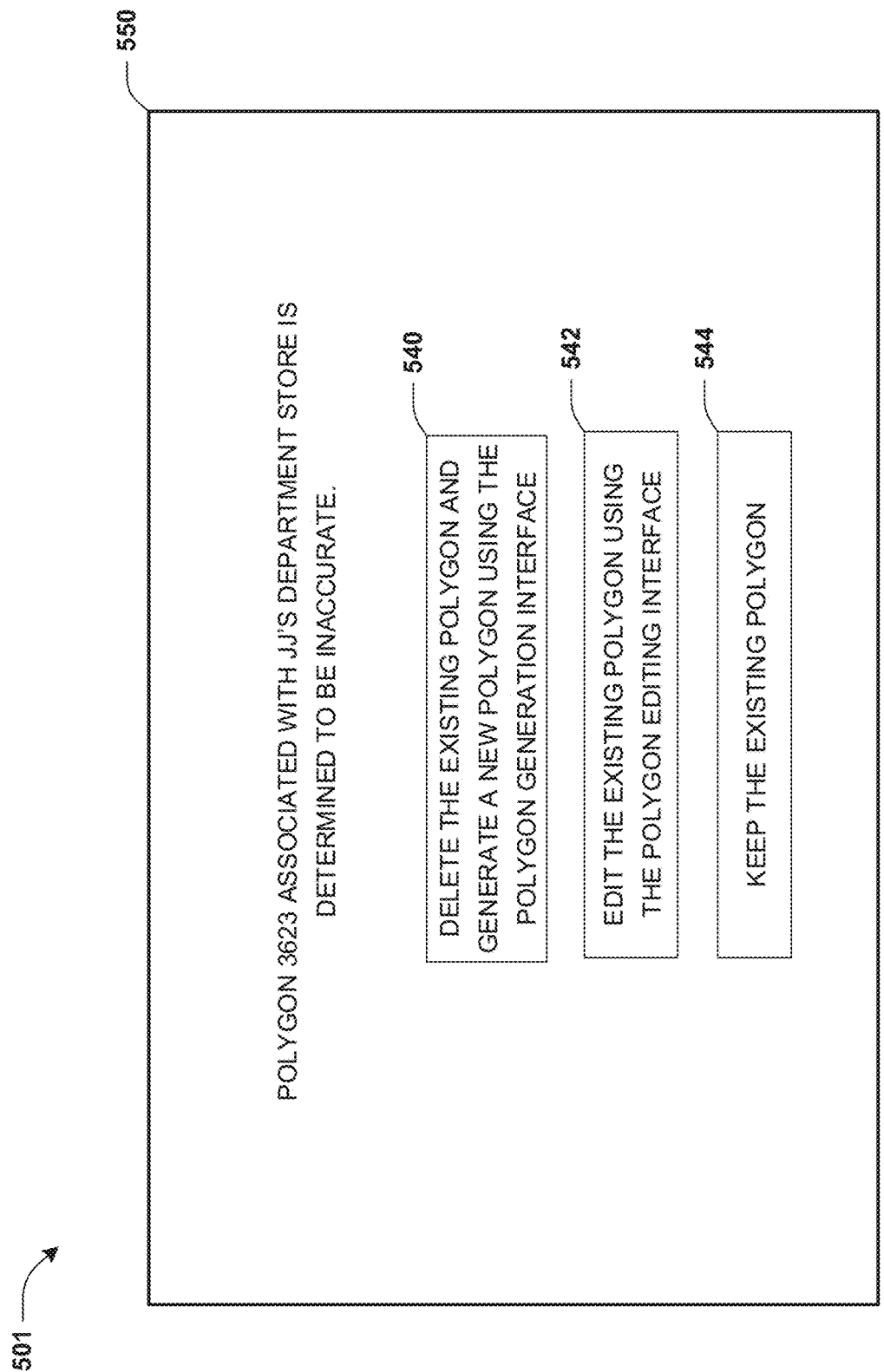
FIG. 5D is a component block diagram illustrating an example system for identifying polygons that are accurate representations of geographical boundaries of properties associated with entities, where a first graphical user interface of a first device is controlled to display a first message.

FIG. 5D illustrates a first graphical user interface of a first client device 550 being controlled to display a first message. For example, the first message may be transmitted to the first client device 550 responsive to determining that the quality score is less than the threshold quality score. In some examples, the first client device 550 may be associated with an administrator (e.g., an engineer, a technician, a person who is tasked with designing polygons and/or making decisions associated with the database of polygons, etc.). For example, the first message may comprise a first selectable input 540 corresponding to discarding the first polygon 502 and/or generating a new polygon using a polygon generation interface. For example, responsive to a selection of the first selectable input 540, the first polygon 502 may be discarded and/or may not be used to determine whether a person visited the first property 504 and/or the first entity. Alternatively and/or additionally, responsive to a selection of the first selectable input, the graphical user interface of the first client device 550 may be controlled to display a polygon generation interface, which may be used to generate the second polygon 548.

Alternatively and/or additionally, the first message may comprise a second selectable input 542 corresponding to editing the first polygon 502. For example, responsive to a selection of the second selectable input 542, the graphical user interface of the first client device 550 may be controlled to display a polygon editing interface. For example, the polygon editing interface may comprise a representation of the first polygon 502, one or more satellite images associated with the first location 532 and/or the second location 536, one or more aerial photography images associated with the first location 532 and/or the second location 536, and/or one or more selectable inputs associated with editing the first polygon 502. One or more inputs may be received via the polygon editing interface. For example, the one or more inputs may correspond to modifications to the first polygon 502, such as modifications to the first area 514 and/or the first radius 518 associated with the first polygon 502, modifications to the first location 532 associated with the first polygon 502, etc. For example, responsive to receiving the one or more inputs, the first polygon 502 may be modified based upon the one or more inputs to generate the second polygon 548.

Alternatively and/or additionally, the first message may comprise a third selectable input 544 corresponding to not discarding the first polygon 502. For example, responsive to a selection of the third selectable input 544, the first polygon 502 may not be discarded and/or may be used to determine whether a person visited the first property 504 and/or the first entity. For example, responsive to the selection of the third selectable input 544, the first polygon 502 may be added to a database of accurate polygons. Locations of client devices may be compared with polygons of the database of accurate polygons to determine which properties and/or entities are visited by people.

Figure 5E:
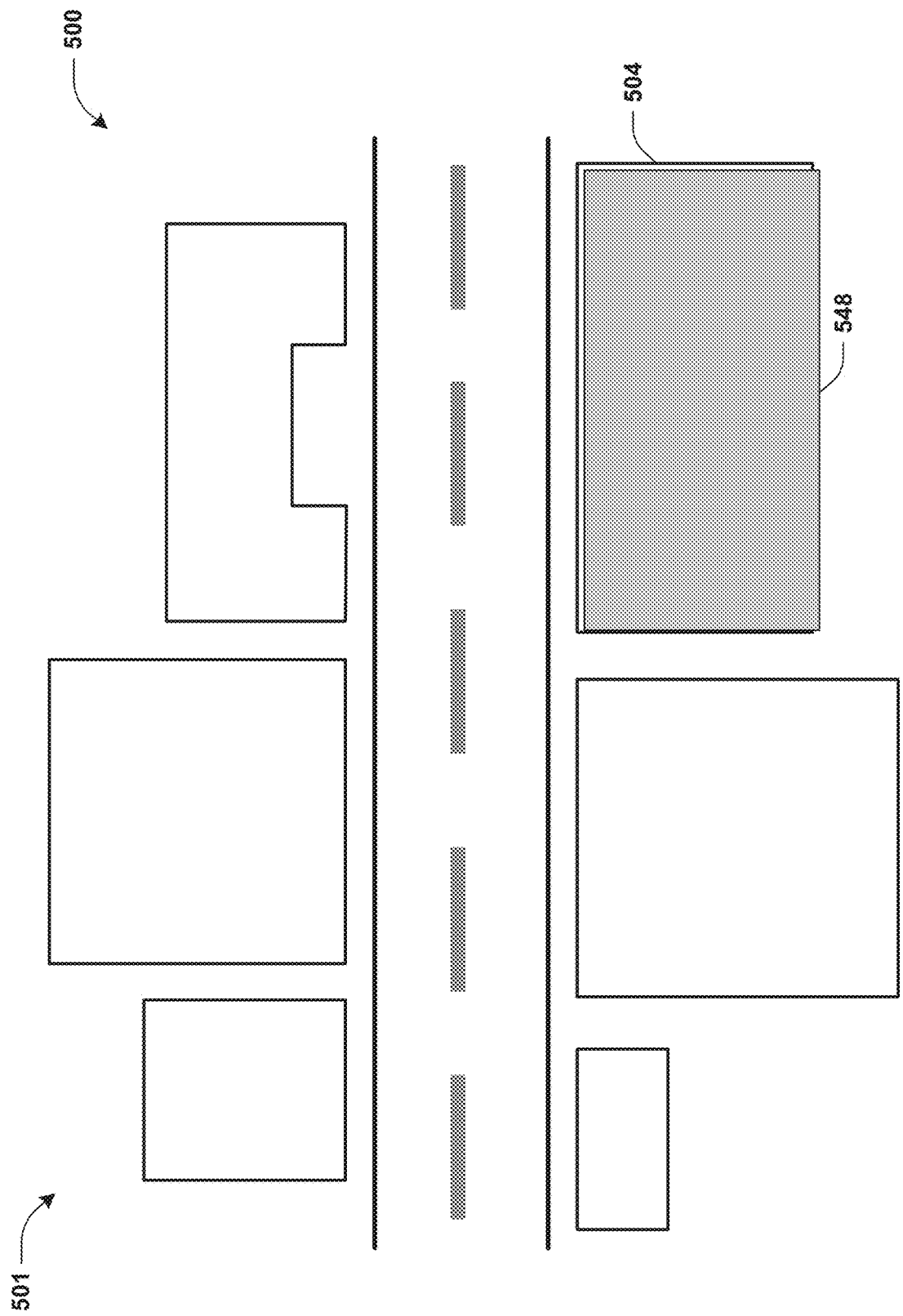
FIG. 5E is a component block diagram, illustrating an example system for identifying polygons that are accurate representations of geographical boundaries of properties associated with entities, comprising a map view of a second polygon comprising a representation of geographical boundaries of a first property associated with a first entity.

FIG. 5E illustrates the map view 500 of the second polygon 548 comprising a representation of geographical boundaries of the first property 504 associated with the first entity. In some examples, the first polygon 502 may be modified to the second polygon 548 (automatically) responsive to determining that the first quality score is less than the threshold quality score. Alternatively and/or additionally, the second polygon 548 may be generated using the polygon generation interface and/or the polygon editing interface. In some examples, the second polygon 548 may be an accurate representation of the first property 504.

Figure 5F:
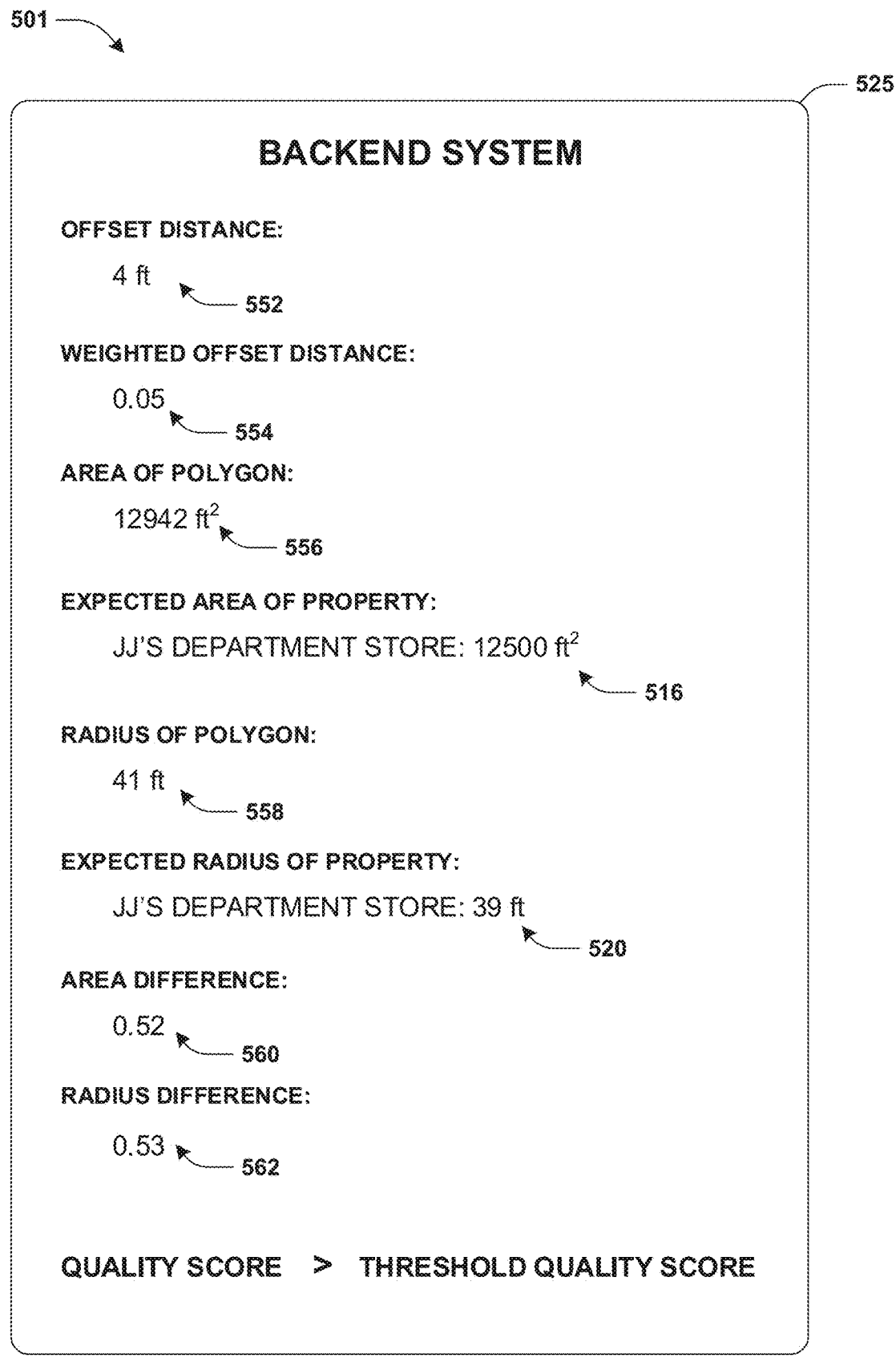
FIG. 5F is a component block diagram illustrating an example system for identifying polygons that are accurate representations of geographical boundaries of properties associated with entities, where a backend system generates a second quality score associated with a second polygon.

FIG. 5F illustrates the backend system 525 generating a second quality score associated with the second polygon 548. For example, a second offset distance 552 (e.g., 4 feet) may be determined based upon a third location associated with the second polygon 548 (e.g., a third center point of the second polygon 548) and the second location 536 of the first property 504. Alternatively and/or additionally, a second weighted offset distance 554 may be generated based upon the second offset distance 552 and/or the first expected radius 520 of the first property 504. For example, the second weighted offset distance 554 may be generated by combining the second offset distance 552 with the first expected radius 520. For example, the second weighted offset distance 554 may be determined by dividing the second offset distance 552 (e.g., 4 feet) by a product of the first expected radius 520 (e.g., 49 feet) and 2

$$\left(e.g., \frac{4}{39 \times 2} = 0.05\right).$$

Alternatively and/or additionally, a second area 556 (e.g., 12,942 square feet) associated with the second polygon 548 may be combined with the first expected area 516 to determine a second area difference 560 (e.g., 0.52). For example, the second area difference 560 may be generated by dividing the second area 556 (e.g., 12,942 square feet) by a product of the first expected area 516 (e.g., 12,500 square feet) and 2

$$\left(e.g., \frac{12942}{12500 \times 2} = 0.52\right).$$

Alternatively and/or additionally, a second radius 558 (e.g., 41 feet) associated with the second polygon 548 may be combined with the first expected radius 520 to determine a second radius difference 562 (e.g., 0.53). For example, the second radius difference 562 may be generated by dividing the second radius 558 (e.g., 41 feet) by a product of the first expected radius 520 (e.g., 39 feet) and 2

$$\left(e.g., \frac{41}{39 \times 2} = 0.53\right).$$

In some examples, the second quality score may be generated based upon the second offset distance 552, the second weighted offset distance 554, the second area 556, the first expected area 516, the second radius 558, the first expected radius 520, the second area difference 560 and/or the second radius difference 562. For example, the second quality score may be generated using the one or more machine learning techniques. Alternatively and/or additionally, the second quality score may be compared with the threshold quality score. For example, it may be determined that the second quality score is greater than the threshold quality score. Responsive to determining that the second quality score is greater than the threshold quality score, the first polygon 502 may not be discarded and/or may be used to determine whether a person visited the first property 504 and/or the first entity. Alternatively and/or additionally, responsive to determining that the second quality score is greater than the threshold quality score, the second polygon 548 may be added to the database of accurate polygons.

Figure 5G:
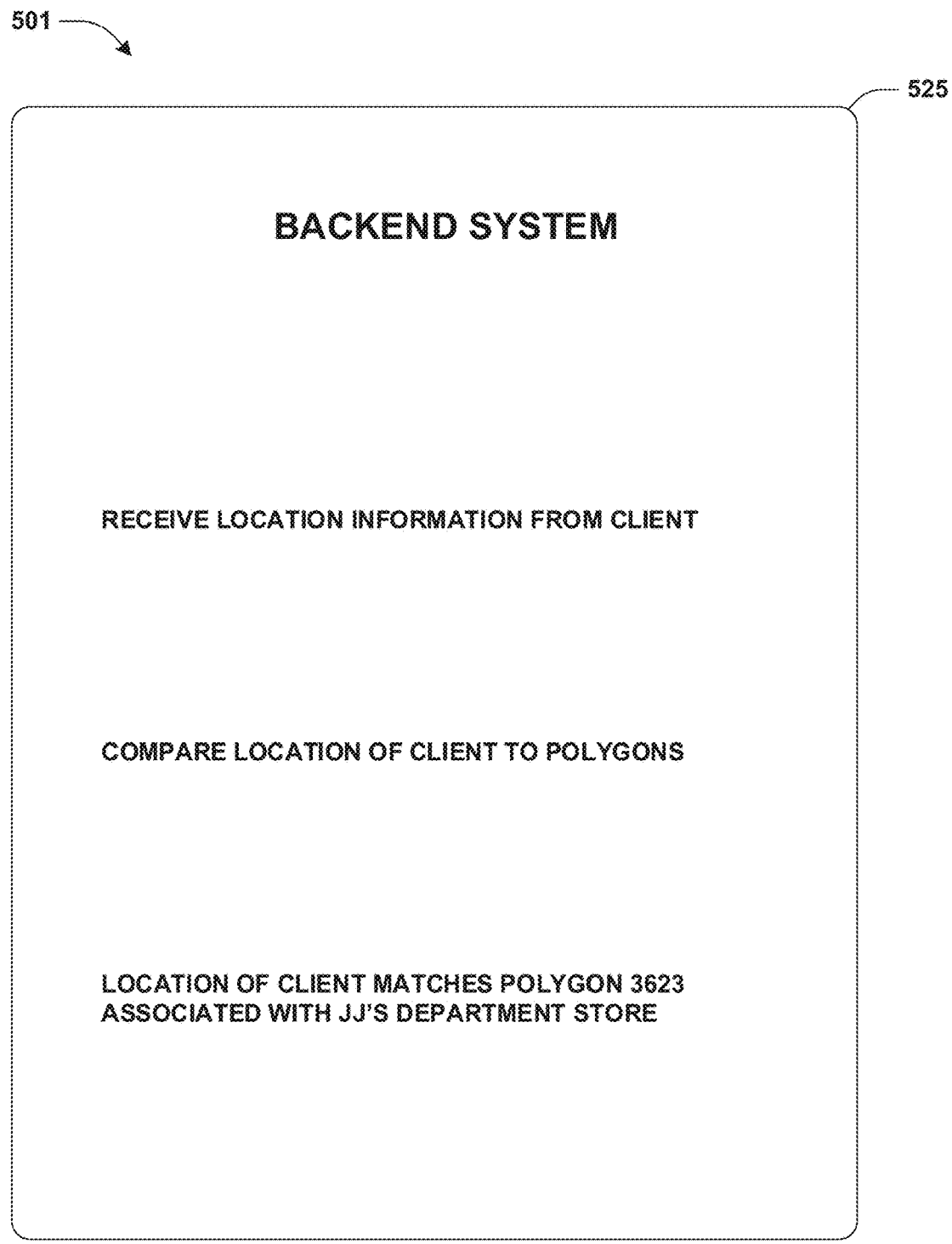
FIG. 5G is a component block diagram illustrating an example system for identifying polygons that are accurate representations of geographical boundaries of properties associated with entities, where a backend system compares a client location of a second client device with a database of accurate polygons.

FIG. 5G illustrates the backend system 525 comparing a client location of a second client device 575 (illustrated in FIG. 5H) with the database of accurate polygons. For example, a location message may be received from the second client device 575. For example, the location message may comprise location information indicative of the client location of the client device 575 and/or a user associated with the client device 575. In some examples, the database of accurate polygons (and/or the database of polygons) may be analyzed based upon the client location. For example, the client location may be compared with polygons of the database of accurate polygons (and/or polygons of the database of polygons). For example, it may be determined that the client location is within the second polygon 548 and/or within a threshold distance from the second polygon 548. In some examples, responsive to determining that the client location is within the second polygon 548 and/or within the threshold distance from the second polygon 548, a first content item 566 may be transmitted to the second client device 575.

Figure 5H:
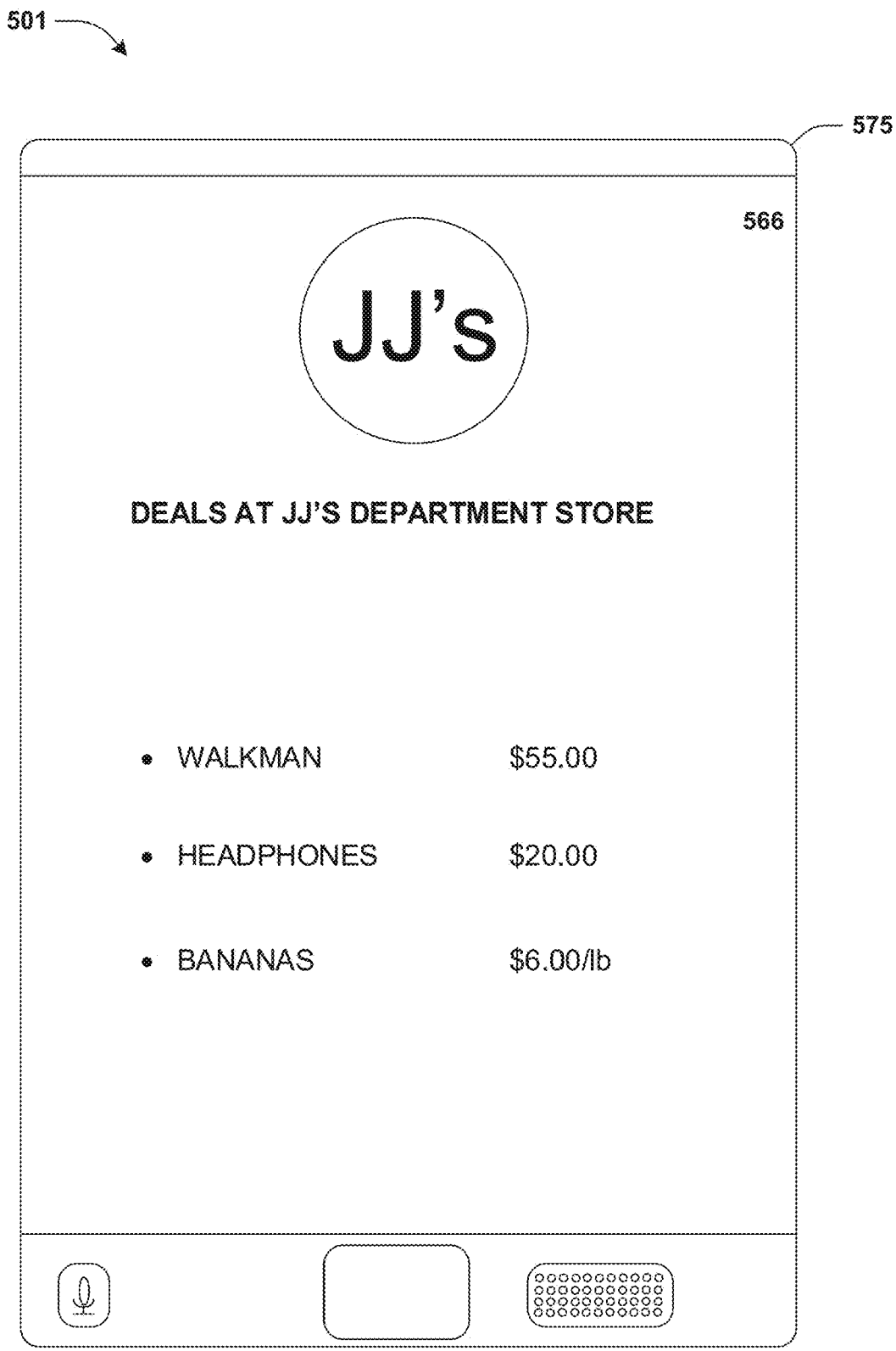
FIG. 5H is a component block diagram illustrating an example system for identifying polygons that are accurate representations of geographical boundaries of properties associated with entities, where a second graphical user interface of a second client device is controlled to display a first content item.

FIG. 5H illustrates a second graphical user interface of the second client device 575 being controlled to display the first content item 566. For example, the first content item 566 may be a notification (e.g., a push notification), an email transmitted to an email account associated with the second client device 575, a second message (e.g., an instant messaging message and/or a text message), etc. In some examples, the first content item 566 may be associated with the first entity (e.g., "JJ's Department Store"). For example, the first content item 566 may comprise information corresponding to the first entity (e.g., the first content item 566 may comprise indications of items that are available for purchase from the first entity at reduced prices, the first content item 566 may comprise indications of new items that are available for purchase from the first entity, etc.).

It may be appreciated that the disclosed subject matter may assist a user (and/or a client device associated with the user) in viewing and/or consuming content associated with subject matter that the user has an interest in.

Implementation of at least some of the disclosed subject matter may lead to benefits including, but not limited to, more accurate generation of maps and/or and precise determinations of locations, properties and/or entities that users and/or devices have visited (e.g., as a result of determining inaccurate polygons that inaccurately represent properties, as a result of transmitting notifications identifying the inaccurate polygons such that the inaccurate polygons may be modified, as a result of determining accurate polygons that accurately represent properties, as a result of comparing the accurate polygons with client locations to determine properties and/or entities that users have visited, etc.).

Implementation of at least some of the disclosed subject matter may lead to benefits including, but not limited to, a reduction in screen space and/or an improved usability of a display (e.g., of the client device) (e.g., as a result of accurately determining which properties and/or entities the user has visited, as a result of determining interests of the user based upon the properties and/or the entities that the user has visited, as a result of enabling the user to automatically consume content associated with subject matter that the user has an interest in, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

Alternatively and/or additionally, implementation of at least some of the disclosed subject matter may lead to benefits including more accurate and precise transmission of content to intended users (e.g., as a result of accurately determining which properties and/or entities the user has visited, as a result of determining interests of the user based upon the properties and/or the entities that the user has visited, as a result of transmitting content to the user based upon the properties and/or the entities, etc.).

In some examples, at least some of the disclosed subject matter may be implemented on a device (e.g., a client device), and in some examples, at least some of the disclosed subject matter may be implemented on a server (e.g., hosting a service accessible via a network, such as the Internet).

Figure 6:
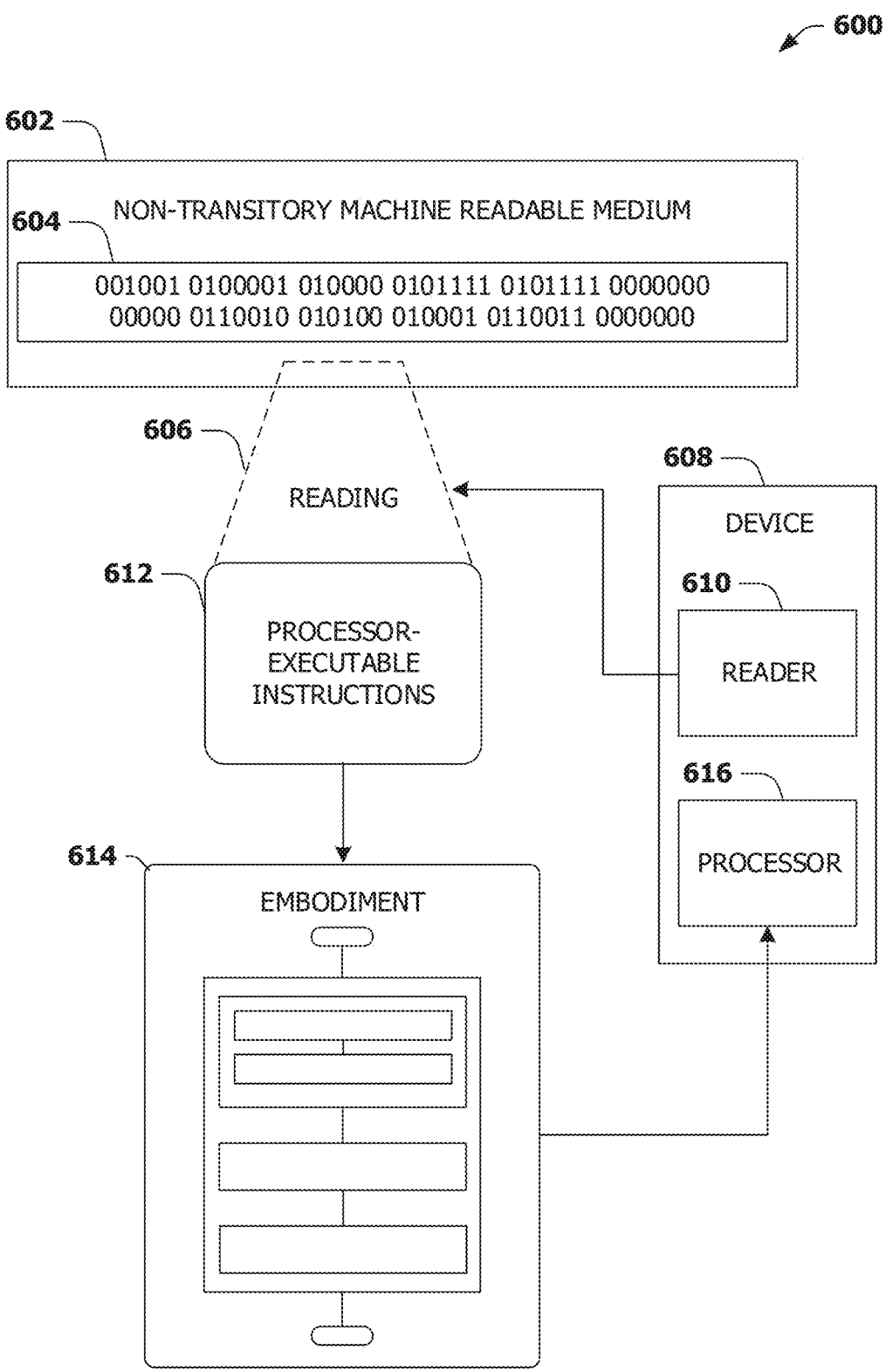
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5H, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   selecting a first polygon from a database of polygons, wherein:
      the first polygon comprises a representation of geographical boundaries of a first physical property associated with a first entity; and
      the first polygon is associated with a first location and a first size;
   analyzing a location database to identify a second location associated with the first physical property, wherein the location database comprises a plurality of locations associated with a plurality of properties;
   determining a first offset distance based upon:
      the first location associated with the first polygon, in the database of polygons, comprising the representation of the geographical boundaries of the first physical property; and
      the second location, in the location database, associated with the first physical property, wherein the first offset distance corresponds to a distance between the first location and the second location;
   analyzing the database of polygons to determine an expected size of the first physical property based upon a plurality of polygons, of the database of polygons, associated with the first entity;
   determining a size difference based upon:
      the expected size, of the first physical property, determined based upon the plurality of polygons associated with the first entity; and
      the first size associated with the first polygon comprising the representation of the geographical boundaries of the first physical property; and
   generating a quality score associated with the first polygon based upon the first offset distance and the size difference.

2. The method of claim 1, comprising:
   determining one or more entities, different than the first entity, that are associated with the first physical property, wherein the generating the quality score is performed based upon a quantity of entities of the one or more entities.

3. The method of claim 1, comprising:
   determining one or more entities, different than the first entity, that are associated with the first physical property; and
   one of:
      determining, based upon the expected size of the first physical property, that the first entity is a parent entity of the first physical property and that the one or more entities are child entities of the first physical property, wherein:
         the generating the quality score is performed based upon the determining that the first entity is the parent entity of the first physical property; and
         the quality score is a first score; or determining, based upon the expected size of the first physical property, that the first entity is a child entity of the first physical property, wherein:
the generating the quality score is performed based upon the determining that the first entity is the child entity of the first physical property;
the quality score is a second score; and
the first score is greater than the second score.

4. The method of claim 3, wherein:
the determining that the first entity is the parent entity of the first physical property comprises determining that the size difference is less than a threshold size difference; or
the determining that the first entity is the child entity of the first physical property comprises determining that the size difference is greater than the threshold size difference.

5. The method of claim 1, wherein the first polygon is associated with a first shape, the method comprising:
analyzing the plurality of polygons associated with the first entity to determine an expected shape of the first physical property; and
determining a shape difference between the expected shape and the first shape of the first polygon, wherein the generating the quality score is performed based upon the shape difference.

6. The method of claim 1, comprising:
responsive to determining that the quality score is less than a threshold quality score, discarding the first polygon.

7. The method of claim 1, comprising:
responsive to determining that the quality score is less than a threshold quality score, displaying, via a graphical user interface of a client device, a message indicative of the quality score being less than the threshold quality score.

8. The method of claim 1, comprising:
responsive to determining that the quality score is less than a threshold quality score, controlling a graphical user interface of a client device to display a polygon generation interface comprising one or more selectable inputs associated with generating a second polygon of the first physical property;
receiving one or more inputs via the polygon generation interface corresponding to the second polygon; and
generating the second polygon based upon the one or more inputs.

9. The method of claim 1, comprising:
responsive to determining that the quality score is less than a threshold quality score, modifying the first polygon to generate a modified polygon based upon at least one of satellite images associated with the second location, the second location or the expected size.

10. The method of claim 1, comprising:
responsive to determining that the quality score is greater than a threshold quality score, adding the first polygon to a database of accurate polygons.

11. The method of claim 10, comprising:
receiving a message from a client device, wherein the message is indicative of a client location of the client device;
analyzing the database of accurate polygons to determine that the client location is at least one of within the first polygon or within a threshold distance from the first polygon; and
responsive to determining that the client location is at least one of within the first polygon or within the threshold distance from the first polygon, transmitting a content item to the client device, wherein the content item is associated with the first entity.

12. The method of claim 1, wherein:
the expected size comprises an expected area of the first physical property;
the expected area of the first physical property comprises at least one of a mean of a plurality of areas of the plurality of polygons associated with the first entity or a median of the plurality of areas; and
the determining the size difference comprises:
determining a second area associated with the first polygon, wherein the first size comprises the second area; and
combining the expected area with the second area to determine the size difference.

13. The method of claim 1, wherein:
the expected size comprises an expected radius of the first physical property;
the expected radius of the first physical property comprises at least one of a mean of a plurality of radiuses of the plurality of polygons associated with the first entity or a median of the plurality of radiuses; and
the determining the size difference comprises:
determining a second radius associated with the first polygon, wherein the first size comprises the second radius; and
combining the expected radius with the second radius to determine the size difference.

14. The method of claim 1, wherein the determining the first offset distance comprises:
determining a center point associated with the first polygon, wherein the first location comprises the center point; and
comparing the center point with the second location to determine the first offset distance.

15. The method of claim 14, wherein:
the first location comprises a first set of coordinates associated with the center point; and
the second location comprises a second set of coordinates associated with the first physical property.

16. The method of claim 1, comprising:
applying a weight to the first offset distance based upon the expected size of the first physical property to generate a weighted offset distance, wherein the generating the quality score is performed based upon the weighted offset distance.

17. A computing device comprising:
a processor; and
memory comprising processor-executable instructions that when executed by the processor cause performance of operations, the operations comprising:
selecting a first polygon from a database of polygons, wherein:
the first polygon comprises a representation of geographical boundaries of a first physical property associated with a first entity; and
the first polygon is associated with a first location and a first size;
analyzing a location database to identify a second location associated with the first physical property, wherein the location database comprises a plurality of locations associated with a plurality of properties;
determining a first offset distance based upon:
the first location associated with the first polygon, in the database of polygons, comprising the representation of the geographical boundaries of the first physical property; and the second location, in the location database, associated with the first physical property, wherein the first offset distance corresponds to a distance between the first location and the second location;

analyzing the database of polygons to determine an expected size of the first physical property based upon a plurality of polygons, of the database of polygons, associated with the first entity;

determining a size difference based upon:

the expected size, of the first physical property, determined based upon the plurality of polygons associated with the first entity; and the first size associated with the first polygon comprising the representation of the geographical boundaries of the first physical property; and generating a quality score associated with the first polygon based upon the first offset distance and the size difference.

18. The computing device of claim 17, the operations comprising:

determining one or more entities, different than the first entity, that are associated with the first physical property, wherein the generating the quality score is performed based upon a quantity of entities of the one or more entities.

19. A non-transitory machine readable medium having stored thereon processor-executable instructions that when executed cause performance of operations, the operations comprising:

selecting a first polygon from a database of polygons, wherein:

the first polygon comprises a representation of geographical boundaries of a first physical property associated with a first entity; and the first polygon is associated with a first location and a first size;

analyzing a location database to identify a second location associated with the first physical property, wherein the location database comprises a plurality of locations associated with a plurality of properties;

determining a first offset distance based upon:

the first location associated with the first polygon, in the database of polygons, comprising the representation of the geographical boundaries of the first physical property; and the second location, in the location database, associated with the first physical property;

analyzing the database of polygons to determine an expected size of the first physical property based upon a plurality of polygons, of the database of polygons, associated with the first entity;

determining a size difference based upon:

the expected size, of the first physical property, determined based upon the plurality of polygons associated with the first entity: and the first size associated with the first polygon comprising the representation of the geographical boundaries of the first physical property; and generating a quality score associated with the first polygon based upon the first offset distance and the size difference.

20. The non-transitory machine readable medium of claim 19, the operations comprising:

determining one or more entities, different than the first entity, that are associated with the first physical property, wherein the generating the quality score is performed based upon a quantity of entities of the one or more entities.

* * * * *